United States Patent [19]
Langlais

[11] Patent Number: 6,091,932
[45] Date of Patent: *Jul. 18, 2000

[54] BIDIRECTIONAL POINT TO MULTIPOINT NETWORK USING MULTICARRIER MODULATION

[75] Inventor: Brian Langlais, Almonte, Canada

[73] Assignee: RegioCom GmbH, Barleben, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/952,441
[22] PCT Filed: May 17, 1996
[86] PCT No.: PCT/CA96/00308
  § 371 Date: May 11, 1998
  § 102(e) Date: May 11, 1998
[87] PCT Pub. No.: WO96/37062
  PCT Pub. Date: Nov. 21, 1996

[30] Foreign Application Priority Data

May 20, 1995 [GB] United Kingdom .................. 9510127

[51] Int. Cl.[7] ........................................... H04J 11/00
[52] U.S. Cl. .............................. 455/5.1; 348/13
[58] Field of Search .................. 348/12, 13, 7; 455/5.1, 71, 4.2; 370/203, 210, 484; 375/373, 375, 370, 260, 261

[56] References Cited

U.S. PATENT DOCUMENTS

| | | |
|---|---|---|
| 3,835,393 | 9/1974 | Marron .................................... 325/308 |
| 4,343,042 | 8/1982 | Schrock ...................................... 455/5 |
| 5,291,289 | 3/1994 | Hulyalkar et al. ...................... 348/723 |
| 5,315,584 | 5/1994 | Savary ....................................... 370/18 |
| 5,361,394 | 11/1994 | Shigihara ................................ 455/5.1 |
| 5,406,551 | 4/1995 | Saito ........................................ 370/19 |
| 5,444,697 | 8/1995 | Leung et al. ............................. 370/19 |
| 5,594,726 | 1/1997 | Thompson .............................. 370/485 |
| 5,687,165 | 11/1997 | Daffara ................................... 370/208 |
| 5,732,068 | 3/1998 | Takahashi ............................... 370/206 |

FOREIGN PATENT DOCUMENTS

| | | | |
|---|---|---|---|
| WO 91/15925 | 10/1991 | WIPO .............................. | H04N 7/08 |
| WO 95/34149 | 12/1995 | WIPO .............................. | H04L 5/06 |

OTHER PUBLICATIONS

"On the Eve of the Revolution" EBU Technical Review, Wood, Jun. 1994.

"A Multicarrier E–HDSL Transceiver System with Coded Modulation" European Transactions on Communications and Related Technologies, Chow, Al–Dhahir, Cioffi &Bingham, May 1993.

"Priciples of Modulation and Channel Coding for Digital Broadcasting for Mobile Receivers" EBU Review—Technical, Lassalle, Alard, Aug. 1987.

"Digital HDTV Broadcasting Over the CATV Distribution System" Signal Processing Image Communication, Moenceclaey & Bladel, Dec. 1993.

"Synchronization Requirements for Multi–User OFDM on Satellite Mobile and Two–Path Rayleigh Fading Channels" IEEE Transactions on Communications, Wei & Schlegel, Feb. 1995.

"High Performance Multimedia Transmission on the Cable Television Network" Information Systems Laboratory—Stanford University, Jacobson & Cioffi, May 1994.

Primary Examiner—Chris Grant
Attorney, Agent, or Firm—Marks & Clerk

[57] ABSTRACT

A two-way point to multipoint data transmission system comprises an upstream unit, a plurality of downstream units, and a transmission line connecting the downstream units to the upstream unit. At least one headend modem is located at the upstream unit and at least one downstream modem is located at the downstream units. The modems employ multitone orthogonal frequency division multiplexing (OFDM) to establish two-way communication between the upstream and downstream units. The OFDM has a tone spacing selected to minimize the ingress of electromagnetic interference at least in the upstream direction.

21 Claims, 13 Drawing Sheets

(1) Remote Symbol Tracking Loop Control
(2) Remote Carrier Tracking Loop Control
(3) Remote AGC Control

BIDIRECTIONAL POINT TO MULTIPOINT NETWORK USING MULTICARRIER MODULATION

CROSS REFERENCE TO RELATED APPLICATIONS

This application is a continuing application under 35 USC 371 of PCT application no. PCT/CA96/00308 filed May 17, 1976.

This invention relates to a two-way point to multipoint data transmission system, such as a CATV (Cable TV) data transmission system capable of carrying data in both the upstream and downstream directions. The transmitted data can be any digital data, such as computer files or digitized audio or video, for example. The digital data is carried over an analog transmission line, such as a coaxial cable or optical fiber.

Cable TV systems have been available for many years. Until recently, they were used only as a means of distributing radio frequency TV channels to subscribers. More recently, it has been recognized that existing cable systems offer a convenient way of providing wide bandwidth data services direct to the home.

In North America, the downstream bandwidth is in the range of 50 to 550 MHz. This downstream bandwidth is being slowly upgraded to 750 MHz and eventually to 1 GHz.

Two-way systems operate upstream typically in the range of 5 to 30/42 MHz, depending on the cable system. The return band (upstream) was initially developed for telemetry systems, security systems, network monitoring, etc., which require relatively low bandwidth.

Originally, the distribution from the head end was entirely over coaxial cable with node sizes ranging up to many thousands of homes. The trend with new systems and upgrades is to use fiber to an optical node in the vicinity of a cluster of 400 to 500 homes. A reduction in the length of the coax run, and the number of amplifiers, is necessary if the upper bound is to be pushed to 750 MHz and then to 1 GHz. It is also necessary to reduce the number of homes on a node so that video on demand, interactive services and voice and data communications will not overload the available shared bandwidth. Reducing the number of homes is also important in limiting the total noise funneled into the head end that, in turn, is a factor affecting maximum data rates.

Due to the return path ingress, only the high end of the return band (18 to 35 MHz) has been considered for "reliable" data communications.

Most ingress enters the CATV plant from the customer premises, either from defective equipment, open stub cables, or poor connections. A primary ingress source is narrow band HAM, CB, and short wave audio broadcasts, in the 5–20 MHz band. Distant short-wave broadcasts tend to affect the entire CATV plant, while HAM, and CB interference are localized problems. This narrow band ingress is generally identified by interference with a slow variation with time (Seconds).

Another primary ingress source is 60/120 Hertz types of broad band impulsive emissions from electric motors. Impulsive noise is spectrally like a random comb generator, with power decreasing with increasing frequency. This broad band ingress is generally identified by interference with a fast variation with time (e.g. 1 mSec spike repeated at 120 Hz). This form of interference originates from electrical arcing or the ionization of air. Impulse interference is more of a problem at the low end of the return band (5 to 18 MHz).

Ingress can be controlled to some extent with high pass filters installed at "all" home demarcation points. However, this complicates the installation of multiple interactive services at the premises. Ingress directly into the CATV distribution plant is also a problem, but this can be monitored with CATV leakage "sniffer" devices, and becomes an ongoing plant hardening procedure.

Another serious downstream impairment is caused by reflections, or echoes, that occur whenever a signal encounters an impedance mismatch. Most CATV systems were originally one way and intended to serve analog TVs only. Even modern TV tuners change impedance when retuned. These tuners typically have poor return loss at the frequency to which they are tuned and much worse return loss, actually approaching zero, at all other frequencies.

Hybrid splitters are used to prevent analog TVs from interfering with each other. Some splitters, however, do not provide enough isolation to protect new digital services employing short symbol times and a high packing factor (bits per Hertz). It has been observed that an analog TV can force a digital TV, in the same home, into a re-equalization training sequence. Even the shortest disruption causes a major problem because of the very high data compression used for digital TV.

In typical CATV systems the most serious echoes have a duration of less than about 250 nS and 99% of all echoes are less than 1.5 $\mu$S.

Various prior proposals for return path Data/Telephony/Video transmission have been made in the light of the above requirements.

Single Carrier modulation (SCM) Binary phase shift keying (BPSK) simply flips the phase of a constant amplitude RF carrier 180°, when the input serial bit stream changes state. With appropriate Nyquist filtering, BPSK will pack up to one data "bit per second" in "one Hertz of RF bandwidth" (1 Bit/Hz). SCM Quadrature phase shift keying (QPSK) generates one of four possible constant amplitude states, which are equally spaced at 90°. QPSK transmits two bits at a time, and achieves up to two bits/Hz spectral efficiency.

QPSK using time domain multiple access data multiplexing is the most common method used for CATV telephony. These systems usually have twenty-four telephony channels (T1) in approximately 2 MHz of RF bandwidth. Remote modems will accumulate data for a 2 ms frame duration, then "burst" the data out. Since the Head End modem cannot acquire the signal instantaneously, a time guard band is required around each channel to allow the receiver to settle.

SCM systems are vulnerable to impulse noise, and high level narrow band jammers. If these modems switch to a clean channel because of ingress, they leave large areas of wasted bandwidth behind. Also, because of the inherent short symbol time downstream, ISI (Inter-Symbol Interference) echoes are a problem requiring the modems to be limited to BPSK/QPSK (1–2 Bits/Hz) without adaptive equalizers.

In CDMA (code division multiple access modulation) the data channels all share the same RF frequency band, but are channel multiplexed by a "repeating" pseudo random (PR) code modulation. CDMA receiver inputs that follow different PR code sequences appear as noise sources, while the desired signal is fully recovered. CDMA can be robust to ingress sources, but these systems tend to trade off bandwidth for noise immunity, just like classical FM quieting.

Most CDMA techniques simply toggle the RF carrier phase 180° in response to the state of the PR (pseudo-random) code. Usually a data-bit of payload is transmitted in a PR code period, so RF spectral spreading increases with longer codes. The ratio between the PR code rate, and the data rate is like a spreading factor (sometimes called Process Gain) which decreases the spectral efficiency. Therefore, a receiver simply inverts the signal in synchronism with the PR code which will de-spread the desired signal. The presence of other PR uncorrelated signals require the CDMA system to have precise power control to be sure the modems each contribute equally to the noise floor.

Asynchronous CDMA systems are not spectrally efficient (typically less than 0.1 bits per Hz), but can be reliable in ingress environments. The received signal-to-noise ratio (SNR) is usually lower with CDMA, due to the cross correlated brother modems. This low SNR prevents CDMA from tracking out low cost TV tuner phase noise imperfections (carrier PLL has narrow bandwidth). CDMA systems do not require exotic adaptive equalizers, because phase shifted echoes will not correlate with the on time PR codes, and the low data rates tend to be immune to ISI.

Frequency Shift Keying (FSK) modulation modems have had the longest life in two-way cable systems to date. These modems transmit one of two discrete frequencies representing the two states of a serial bit stream. This modulation technique is generally used for CATV active element status monitoring (amplifiers, optical nodes, etc.). FSK has a low bits-per-Hertz rate, and in this respect it is similar to CDMA systems, but it is not as immune to ingress due to lack of FM quieting (Narrow Band FM).

An object of the invention is to alleviate the aforementioned disadvantages of the prior art.

SUMMARY OF THE INVENTION

According to the present invention there is provided a two-way point to multipoint data transmission system comprising an upstream unit, a plurality of downstream units, and a transmission line connecting said downstream units to said upstream unit. At least one headend modem is located at said upstream unit and at least one downstream modem is located at said downstream units. The modems employ multitone orthogonal frequency division multiplexing (OFDM) to establish two-way communication between said upstream and downstream units. The OFDM has a tone spacing selected to minimize the ingress of electromagnetic interference at least in the upstream direction.

The transmission line can be a coaxial cable, an optic fiber, or similar medium. Typically, the transmission line carries RF signals in the downstream direction up to in the 50 to 550 MHz range, and possibly up to 1 GHz or more.

OFDM is a multi-carrier modulation scheme (MCM. This means that data is transmitted on several RF carriers (or sub-carriers), instead of one. OFDM tends to be more robust against time domain impulse interference due to its long symbol time, which tends to average out these effects. OFDM modems require more hardware for the Fast Fourier Transform (FFT) modulator, but this is traded off in the equalizer hardware requirements of high capacity SCM modems.

Typically, the upstream modem is connected to a network, such as the PSTN, via a network manager, such as a Newbridge Networks Corporation network manager. Channels are established on respective groups (typically 8) of sub-carriers or tones with 2 KHz spacing to the respective downstream modems. Each downstream modem is allocated a specific group of tones. To connect an incoming DS0 channel, for example on a T1 link, the network manager simply modulates the tones associated with the outgoing OFDM channel to the desired subscriber. One of the advantages of associating each channel with a specific group of tones is that the downstream hardware can be simplified, and thus reduced in cost, since the downstream modems are not required to grab all the tones. The complexity of the FFT is substantially reduced.

The orthogonal property of OFDM means each sub-carrier is independent or orthogonal to other sub-carriers or tones. So even though the RF spectra actually overlap on a spectrum analyzer display, the decoding process does not see this interference.

In the time domain, the orthogonality concept is simply illustrated by considering two OFDM sub-carriers which switch to new amplitude, and phase values for every symbol time. If both signals are converted to baseband, there is one desired baseband value, plus the other signal riding on the DC (at 2 KHz×N). A symbol synchronized integrate and dump will completely reject the unwanted AC sub-carrier, because every symbol period has an exact integer number of sub-carrier sinusoids which always integrate to "zero".

In the frequency domain, OFDM data carrier waves are frequency spaced by the inverse of the symbol time, with sub-carrier power spectra completely overlapping each other, such that each adjacent tone is positioned in its neighbor's spectral "null". This "null" is always exactly at the symbol clock frequency from the center of the channel, and is present in all QAM power spectra. This spectral "null" creates the orthogonality window when the demodulator is time symbol locked.

In the return path, sub-carriers from different remote subscriber transmitters become orthogonal when the symbols appear at the same time at the CATV head end, as if the signals were transmitted from one large virtual IFFT. When not locked, the FFT (Fast Fourier Transform) demodulator spectral output will be distorted by the unwanted sin(x)/x spectral leakage, instead of clean discrete "QAM" vectors. This sin(x)/x roll-off is based on sub-carriers spaced 2 KHz apart, so this gives the RF spectrum a natural quick roll-off characteristic (−40 dB at 150 KHz from last sub-carrier).

OFDM's lower level individual QAM sub-carriers are more vulnerable to single CW jamming. However, individual sub-carriers can be turned off or operated at reduced throughput, to avoid jammers. Alternatively, active cancellation technology can be used to remove them. By contrast SCM schemes can be rendered useless by a single jammer.

OFDM uses a large number (ranging from 100's to 1000's) of narrow band sub-carriers, (of typically 1–10 kHz each). A practical example is 2900 tones with 2 KHz spacing filling a 6 MHz NTSC television channel. This results in the symbol period being correspondingly 100's to 1000's of times greater. Because the symbol time can be made much longer than significant echo paths, inter-symbol interference does not occur and the elaborate dynamic adaptive equalizer, required in SCM systems, is avoided. In typical CATV systems, 99% of echoes are less than 1.5 $\mu$S in duration. If the symbol time is 150 $\mu$S or greater, then a 1.5 $\mu$S guard band, or cyclic prefix, represents only a 1% overhead. Also, the cyclic prefix, in contrast to an adaptive equalizer, is simple and works well.

The sub-carrier set is modulated/demodulated simultaneously with a single modulator/demodulator. The sub-carriers can be placed "shoulder to shoulder" and they do not interfere with each other if they are orthogonal. The sub-carriers become orthogonal when the symbol update occurs simultaneously on all sub-carriers and each sub-carrier transmits exactly an integral number of cycles during the symbol period.

If the spacing of the sub-carriers is 2 kHz, which is the preferred spacing in accordance with the invention, the symbol period will be 500 $\mu$S and the sub-carrier bandwidth will be 2 kHz. Each sub-carrier is modulated with typically nQAM where the value of n is limited by the system noise and the required BER performance. Typical CATV networks, with 2000 subscriber optical nodes, will allow 32-QAM (Quadrature Amplitude Modulation) upstream which yields 5 bits per Hertz gross which becomes 4.0 to 4.8 bits per Hertz net (after allowing for the overhead of control and synchronization). It is possible that 64-QAM or even 256-QAM will yield acceptable performance, especially downstream, but may also require the addition of forward error correction.

OFDM uses a block modulation and demodulation method and one head end modem can serve many homes. A practical head end modem can process approximately 1 MHz of bandwidth (nominally 544 sub-carriers) which can provide up to 64 DS0 channels (Each DS0 is 64 kb/s of data/voice each with approximately 2 KHz of out-of-band telephony signaling). Each home can operate on a different set of eight of 2.03125 kHz spaced sub-carriers (not exactly 2 KHz due to cyclic prefix overhead as discussed later). The entire set of sub-carriers is block modulated with an IFFT and block demodulated with an FFT. In the home the FFT is much smaller since it only has to process the set of sub-carriers being used.

Preferably, the upstream OFDM is remotely synchronized from the headend receiver using a remote control phase locked loop (PLL), a remote control symbol alignment loop, and a remote control amplitude gain loop (AGC). All signal adjustments are completed by remote subscriber transmitters controlled by the headend receiver. This remote control upstream control system makes all the sub-carriers appear as if they came from one large IFFT (Inverse Fast Fourier transform) transmitter in the field, but actually the signal comes from several smaller IFFTs. Downstream receivers process these same three tracking loops on their own.

An important advantage of this network architecture is the spread-spectrum-like signal modulation, which allows for curbside modems which support up to 16 DS0 channels to work efficiently adjacent single subscriber DS0 POTS modems with no change in headend hardware. Therefore, this modulation technique offers a true bandwidth on demand architecture, to support an ever changing telephony/data market place.

Secondly, this modulation scheme minimizes the effects of ingress by spreading the information on many different spectral lines. This modulation technique also allows for a large bits/Hz modulation packing factor, without using high Q channel filters with associated complex channel equalizers. Initially design calls for conservative spectral efficiencies of 4 bits/Hz (including channel filtering).

The telephony modems can be made very economical and reliable in the long term, as the signal processing presently is predominantly digital. Therefore, the design lends itself to large scale ASIC integration with minimum technical risk. The signals are sampled/demodulated, and digitally synthesized/modulated at HF intermediate frequencies, with all PLL tracking loops completed with digital signal processing. Analog components which will require alignment will be designed out, to allow simple automated testing, and assembly procedures to give the customer high quality at minimum expense.

Newbridge Networks management systems can control and monitor the telephony/data modems, and the CATV/Fiber distribution plant hardware. This one system solution to network management leads to a more efficient system management architecture.

Another advantage of the network architecture is that it can co-exist with the standard NTSC, PAL, SECAM and HDTV systems, with no special video interface equipment. Furthermore, if the curbside modems are employed then video interdiction of pay TV and OFDM services may be implemented, with upgrade modules, to achieve addressable taps for video control if required by future regulations.

The telephony capacity can be increased over the recommended capacities by simply allowing more bandwidth than the recommended 12 MHz. The system can be incremented in 16.25 Khz (1-DS0) bandwidth steps (forward and return direction increment). This incremental step will allow one more Single Subscriber drop (SSD) unit to be installed to increase the capacity of a fiber node by 1 subscriber. Optional OFDM interdiction modules should be changed with this modification, but a system that does not require secure privacy will increment without changing any Curbside hardware modules. This expansion will require another 1 MHz bandwidth headend RF modem shelf to start the growth process.

BRIEF DESCRIPTION OF THE DRAWINGS

The invention will now be described in more detail, by way of example only, with reference to the accompanying drawings, in which.

DETAILED DESCRIPTION OF THE INVENTION

Figure 1:
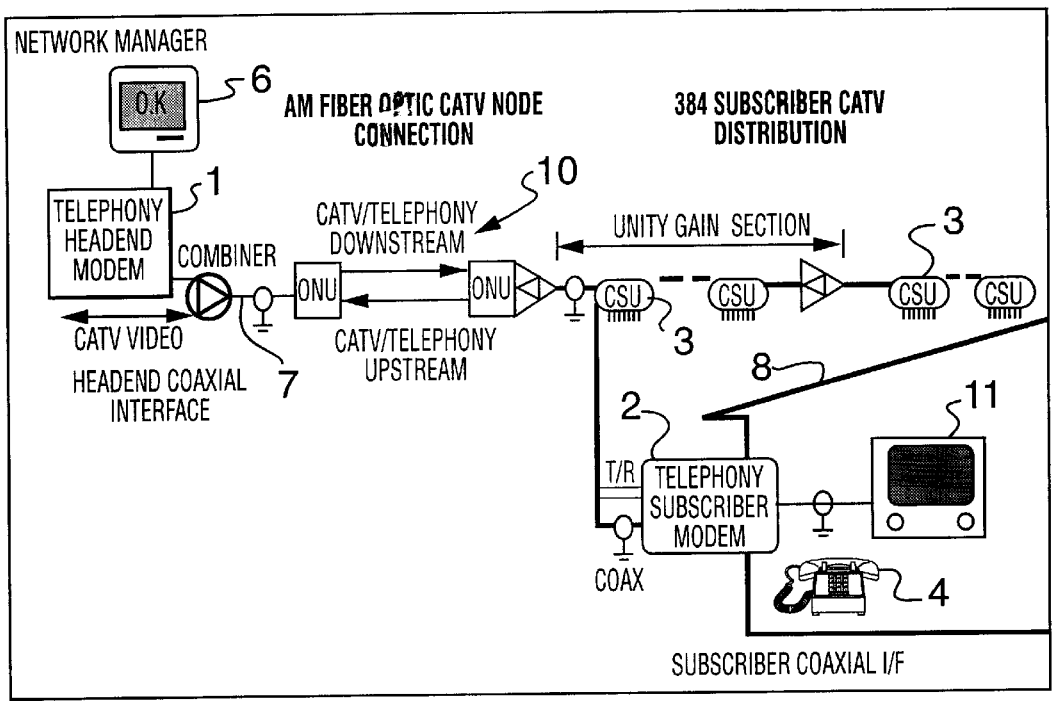
FIG. 1 shows a standard 384 subscriber passed Fiber/Coax node architecture, which employs six headend modems.

As shown in FIG. 1, the invention allows regular telephony (POTS) services to be distributed through a hybrid fiber/coaxial CATV plant 10. The design is based on a common Headend Unit 1, which corresponds to a cell of approximately 500 telephony/CATV subscribers 11. Each headend 1, which is connected to a network manager 6, such as a Newbridge Networks Corporation 3600, multiplexes E1 or T1 links to/from the Data/Telco onto an OFDM RF stream for delivery to/from the subscriber via a fiber/coaxial link 7. Any individual DS0 channel on the T1/E1 link can be connected to any subscriber, under network configuration control from the network manager 6 over a channel formed by eight tones of the OFDM signal. A specific group of 8 tones is allocated to each subscriber per DS0 channel. If a subscriber wishes to have more bandwidth, he or she is simply allocated more tones of the OFDM signal.

Each headend unit 1 is capable of supporting the switching, multiplexing, and transport of up to 768 DS0s (in which case 12 modems are required), depending on the exact configuration selected. All services are provided by the central office equipment via the TR0008 or TR0303 (V5.2 in Europe) DLC interface(s). The system described provides no inherent Central Office services (i.e. dial tone, etc.).

The system is transparent to all existing telephone station and television receiver equipment currently within the subscriber's premise 8. The standard tip and ring interface with the capacity for two separate lines is supplied at the standard telephony demarcation interface box 2.

One embodiment of the invention calls for the deployment of intermediate curbside units 3 (CSU) for approximately every eight to sixteen customers. These curbside units provide the interface from the upstream RF multiplexed DS0s to the individual subscribers 4. This distribution scheme can deliver 16 DS0s to each of 48 curbside units or approximately 768 DS0s per headend unit. The curbside units 3 interface directly to the coaxial cable from the distribution network to individual tip and ring pairs for Telco voice and data to each customer, and individual coax video feeds for each customer.

In the case of a curbside distribution scheme, the curbside units receive all their incoming data from the CATV coaxial cable. The CATV signal then continues to the home for CATV services, while the customer Data/Telco information is removed, and connected to the individual Telco SLIC (Subscriber Line Interface) circuitry 14. The curbside unit is powered off the cable power supply via the cable interfaces, or using external mains connections.

Figure 2:
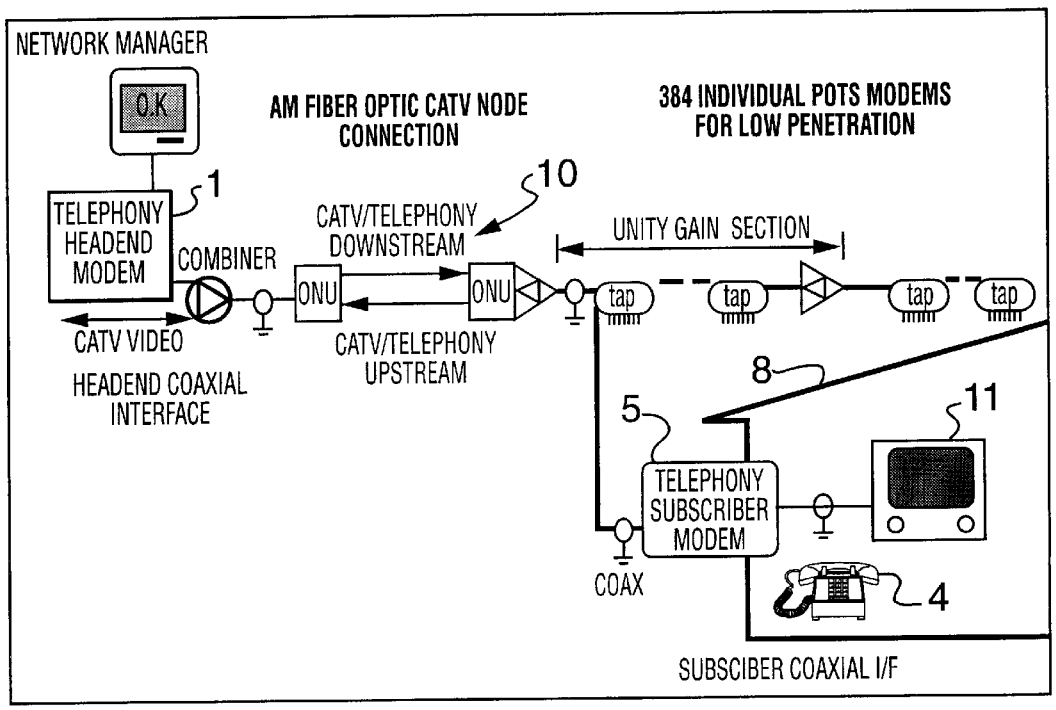
FIG. 2 shows Low Data/Telco penetration Fiber/Coax node architecture for 384 subscribers using 6 Headend Modems.

A variation of the above architecture (shown in FIG. 2) requires no curbside units for low penetration telephony applications. These two architectural schemes can be mixed within the same fiber node, under the network management control. Furthermore, the headend modem hardware remains the same for both architectures. This household cable product is referred to as a Single Subscriber Drop (SSD).

The use of OFDM modulation allows for bandwidth on demand without requiring parallel RF modems, which are expensive. In practice, 8 tones 2.03125 KHz apart are required for each DS0 channel. These tones remain associated with that channel. If higher bandwidth is required, it is a simple matter to allocate that customer additional tones. For example, for a bandwidth of 256 Kbs, the customer will be allocated 32 adjacent tones of the OFDM signal.

In this low Data/Telco penetration configuration, the headend unit 1 is coupled directly to an RF interface unit at each customer. In this configuration, 1-DS0 to 4-DS0 (configurable POTS, data interface, or mixed) can be transported to each customer. Again, approximately 768 customers can be serviced. This unit couples directly to the coaxial distribution network, and directly outputs both the coaxial video connection, and Telco tips/rings for each subscriber (or 10BaseT Ethernet for Internet access or V.35 for business data).

In this case, the headend units 1 couple directly to the customer premise units (CPE) 5. All the information is received at the CPE 5 via the coaxial cable. The CATV information is passed through to the customer CATV cabling while the Data/Telco information is removed and can be supplied to the customer on the appropriate interface.

As the information to the customer is essentially carried unmodified from the central office, any type of customer interface is feasible. As the data is carried as DS0s, all forms of POTS and data services are easily accommodated. Special circuits such as coin interfaces or traffic light controllers can be provided by special terminating circuits at the customer premise.

The fiber/coax power supply has battery back-up which delivers power to the active hardware in the event of a power failure. The POTS subscriber loop interface, and RF modem is also powered from this CATV network, so local battery back-up for each POTS interface is not required. This technique of network powering eliminates the need for failure prone batteries at each subscribers residence.

In one embodiment, the headend unit 1 employs twelve RF OFDM modems to communicate with 48 Curbside units. The headend modem collects and distributes telephony data to the Central Office, via standard Newbridge Network Corporation telephony interfaces. The headend has switching capabilities which allow any DS0 to use any Central Office DS1 time slot, under the Newbridge network management control. Signal switching is achieved by TDM baseband switching at the headend, plus RF channel selections can be manipulated for noise ingress control. The video bands are filtered from the headend receivers to ensure no lone jammer tone in the forward or reverse path will interfere with the telephony life line.

Figure 3:
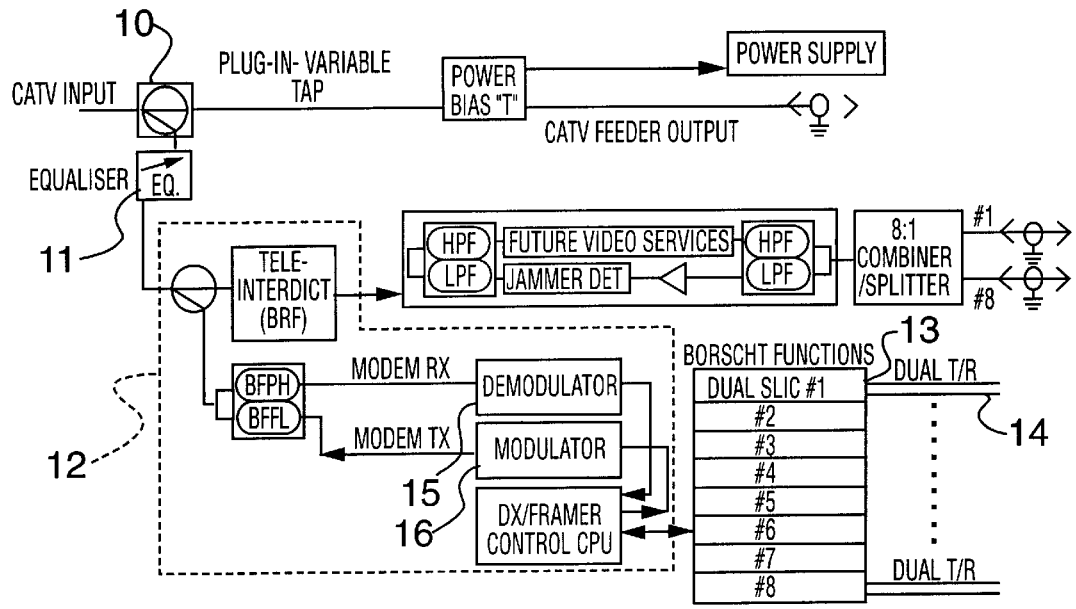
FIG. 3 is a block diagram of a curbside unit.

The curbside unit 3, shown in FIG. 3, distributes the standard CATV signals and Telephony tips/rings to eight to sixteen subscribers. This unit has plug-in Tap 10 and Equalizer modules 11 to set the RF signal levels for the individual drops along the CATV cascade. This unit also contains a single high speed RF modem 12 to merge the telephony/data signals into the headend unit 1. The unit contains 8 to 16 subscriber Data/Telco modules 13 which can be a SLIC, a dual SLIC (Subscriber Line Interface Circuit), or a hybrid SLIC with data combination. The tip and ring signals 14 exit the Curbside unit in a manner that maintains the hermetic and EMI shielding of the enclosure. Furthermore, the tips and rings have an external barrier connection box on the Curbside unit shell, to allow individual subscriber physical connections without opening up the Curbside unit. This unit derives its power from the CATV system. No wiring changes are required inside the homes.

Figure 4:
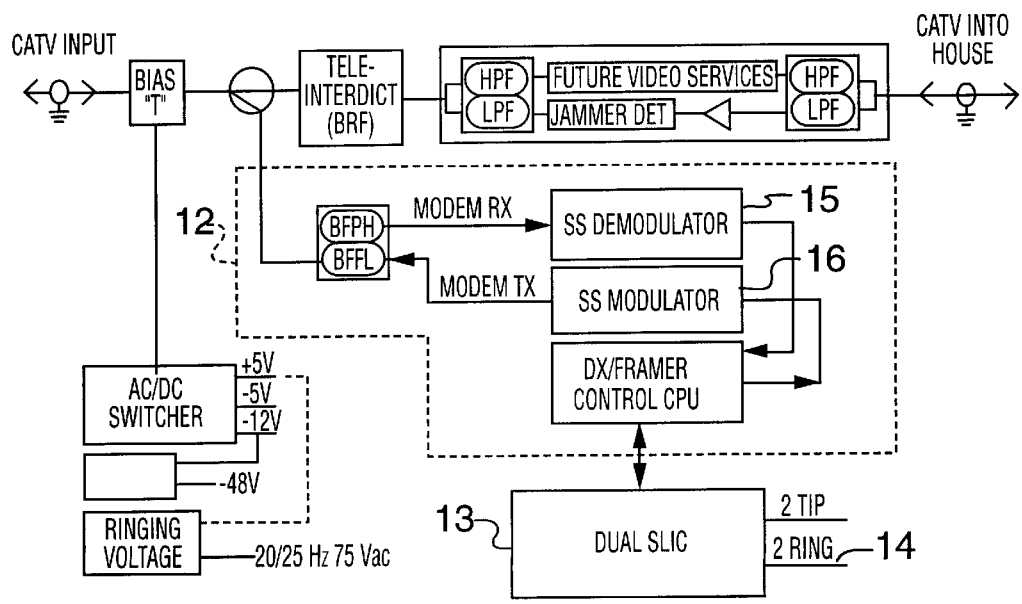
FIG. 4 is a block diagram of a subscriber modem.

The low penetration SSD unit (FIG. 4) distributes the standard CATV signals and Telephony tips/rings 14 to an individual subscriber. This unit contains a single high speed RF modem 12 to merge the telephony/data signals into the headend unit 1. The unit contains subscriber Telco modules 13 which can be a SLIC, a dual SLIC, or a hybrid SLIC with data combination. The tip and ring 14 signals exit the SSD unit in a fashion to maintain the hermetic and EMI shielding of the enclosure. This unit derives its power from the CATV system or from the home mains for non-life-line Data/Telephony. No wiring changes are required inside the home.

A single headend modem design can be used for curbside high speed modems, and the Single Subscriber Drop (SSD)

modems. This is because the return multi-tone transmitters can come from "different" sources with a different number of tones each, to produced a net "constant" sum of tones. This gives a bandwidth on "demand" system using a common multi-tone headend modem architecture.

Figure 5:
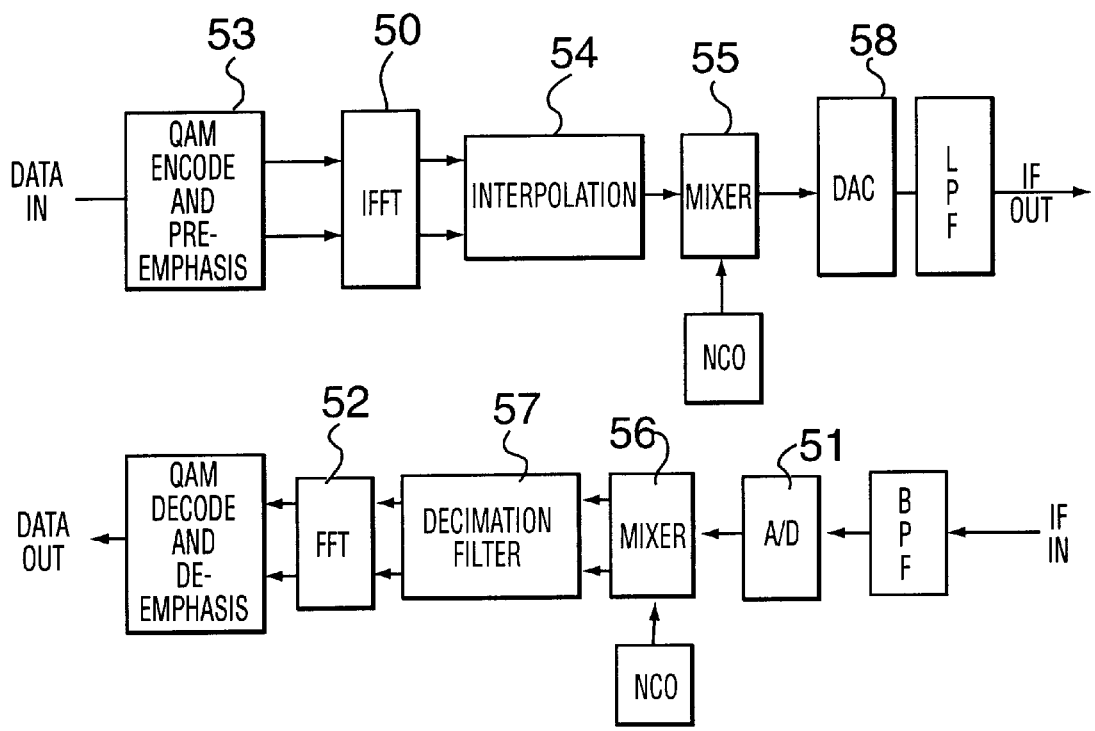
FIG. 5 is a block diagram of a digital OFDM modem.

FIG. 5 is a simplified block diagram of an OFDM modem suitable for the headend and downstream units, although the Fast Fourier processing is simpler in the downstream units because only selected groups of tones are grabbed. The OFDM is generated by a real time software IFFT 50 as shown in FIG. 5. Input data is passed through QAM encoder 53 to IFFT transmitter 50, which calculates a time sampled series signal representation of the summation of all the individual QAM sub-carriers for a particular symbol. This composite time series waveform is derived from an input set of desired magnitude and phase values from each OFDM sub-carrier. The QAM vector of an OFDM sub-carrier is set by writing the appropriate amplitude and phase value into an IFFT frequency spectral input register. The transmitter IFFT 50 process is repeated continuously for each new symbol update (e.g. 2 KHz symbol update rate). This output stream of numbers is passed through filter 54, frequency converter 55, and transformed to analog voltage values representing the first intermediate frequency for the CATV modulator in digital-to-analog converter 58. This signal is then up-converted to the desired transmission channel.

The OFDM signal could alternatively be generated with multiple symbol-synchronized analog QAM modulators with harmonically related local oscillators spaced at the symbol update frequency. The output of each of these QAM modulators becomes an OFDM sub-carrier, which is combined with the others even though the RF spectrums overlap. This technique would not be practical with analog hardware techniques, but it illustrates the modulator operation.

The OFDM receiver converts the RF channel to an intermediate frequency which is sampled and digitized by an analog to digital signal converter 51. The output of analog-to-digital converter 51 is passed through mixer 56 and decimation filter 57 to FFT receiver 52, which converts this input sampled time series of an OFDM symbol into a group of independent sub-carrier magnitude and phase components which represent the QAM signals on each sub-carrier. The receiver FFT process is repeated continuously for each new symbol update (e.g. 2 KHz symbol update rate). These QAM values are converted to a set of received numbers representing the OFDM symbol. For example, 100 sub-carriers each modulated with 32-QAM (5 bits/Hz) represent a new 500 bit data output value, for every symbol update.

Like the modulator, an OFDM signal can be demodulated with multiple symbol-synchronized analog QAM demodulators with harmonically related local oscillators, spaced at the symbol update frequency. The output of each of these QAM demodulators becomes the data output for each sub-carrier. A simple QAM demodulation consists of an In-phase and Quadrature mixer stage typically followed by symbol-locked integrate-and-dump low pass filter. This technique would not be practical, but it does illustrate the demodulator operation.

Figure 6:
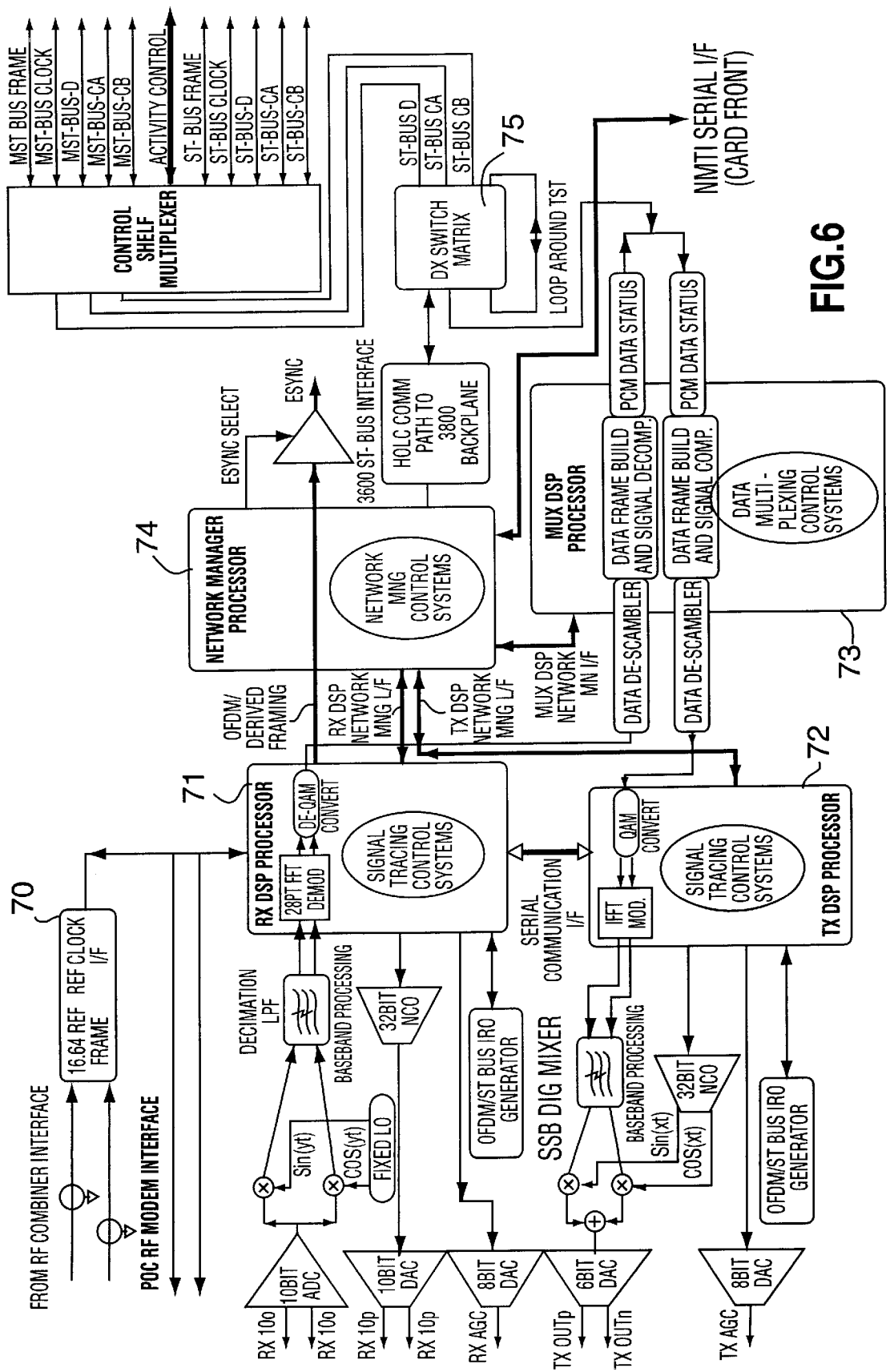
FIG. 6 is a more complete block diagram of an OFDM modem.

As shown in FIG. 6, the modem has a receive DSP (Digital Signal Processor) 71 and a transmit DSP 72 implementing the receive and transmit functions, including the signal tracking control systems described in more detail below. The receive DSP is connected to an RF combiner interface, shown in more detail in FIG. 7. The modem also includes a network management processor 74 that is responsible for handling tone assignments and other management functions within the modem. The network management processor 74 communicates with a Newbridge Networks Corporation 3600 Bandwidth manager over a 3600 ST-bus interface. An HDLC link 75 is also provided for connection to the 3600 backplane. The modem is essentially the same for the headend and downstream units, the main difference lying in the size of the FFT as will be described with reference to FIGS. 9 and 10 below. Also since the headend modem is in effect acting as a master, it does not need to make symbol time adjustments.

Figure 7:
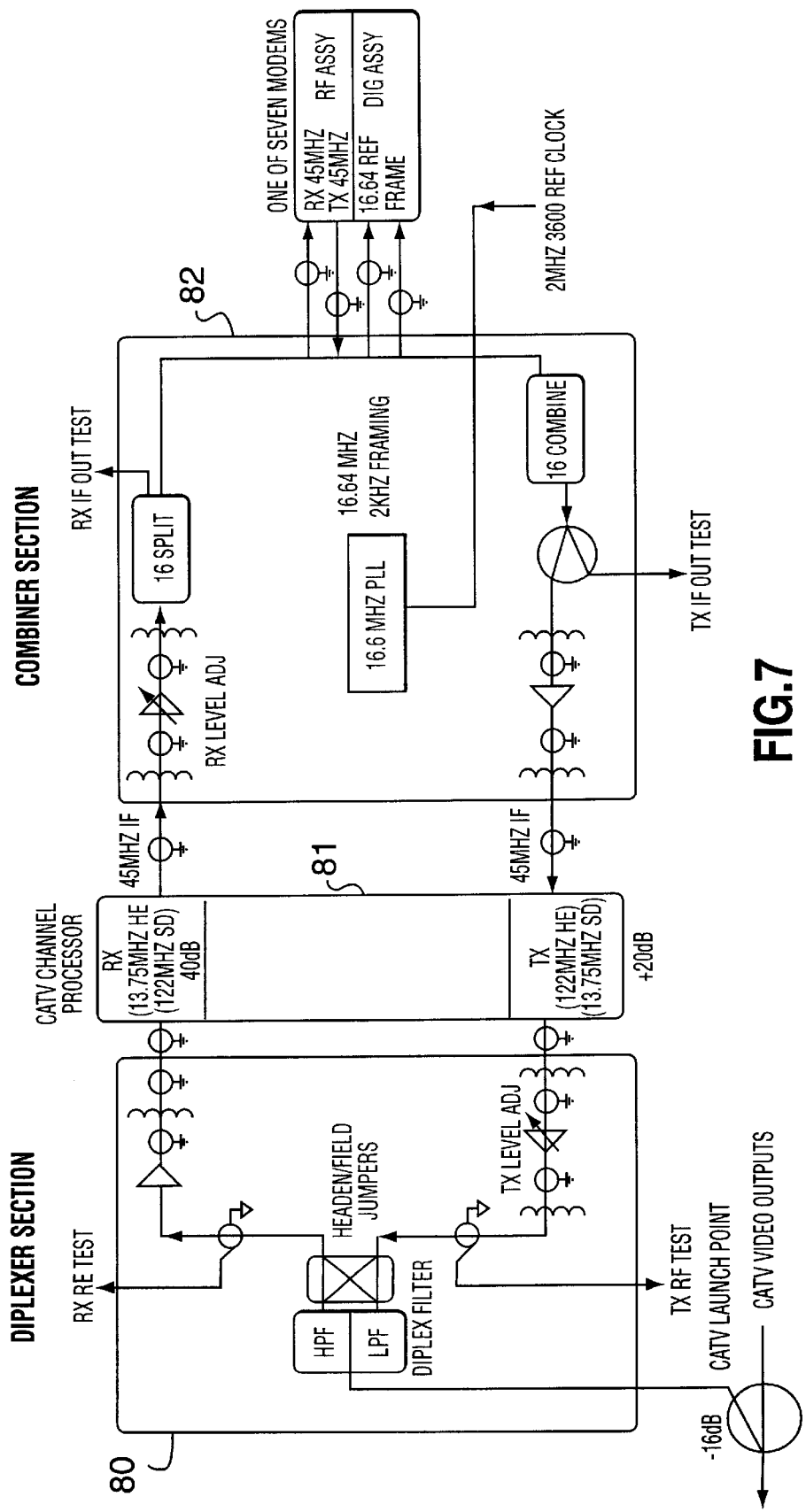
FIG. 7 is a block diagram of an RF combiner.

The RF combiner shown in FIG. 7 provides the interface between the cable system and the digital modem described in FIG. 6. The RF combiner includes a diplexer section 80 for connection to the cable system, a channel processor 81, and a combiner section for connection to the RF portion of the modem shown in FIG. 8.

Figure 8:
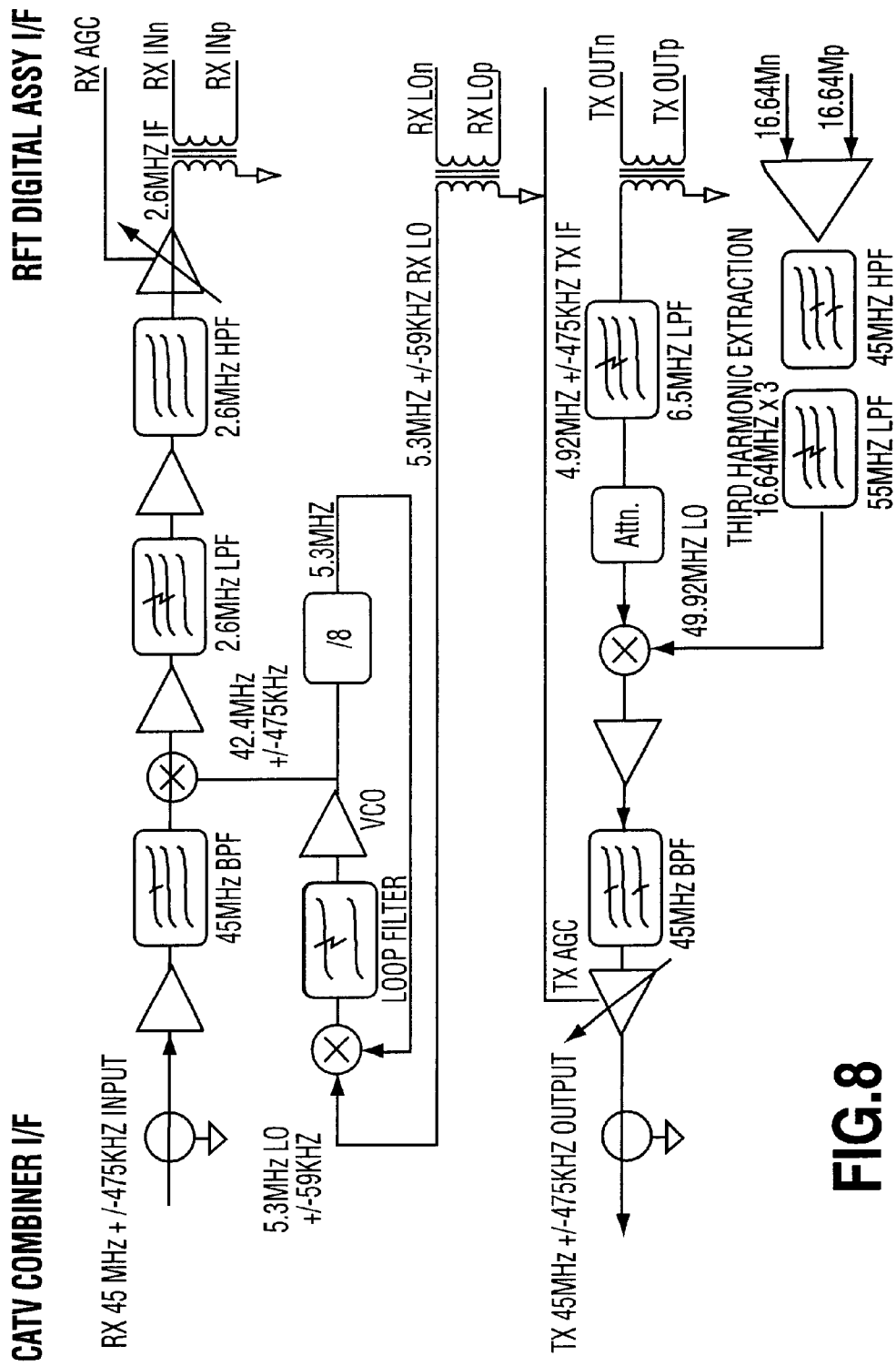
FIG. 8 is a block diagram of an RF modem block.

FIG. 8 is a block diagram of an RF modem block.

In typical cable systems most dominant signal echoes are less than 1.5 $\mu$S in duration (<1800 ft). OFDM modems can employ a time guard band signal between symbols known as a Cyclic Prefix, which eliminates the need for an equalizer, which would counteract a channel echo impairment.

The Cyclic Prefix is a waveform extension applied in front of the OFDM symbol waveform, derived from the same symbol's tail pattern. This cyclic symbol extension allows for the previous symbol transient response to settle (largest echo time determines time guard band), and the signal has a partial cyclic appearance to the FFT demodulator. This pseudo constant symbol appearance to the demodulator eliminates echo transient effects at a low bandwidth overhead cost.

If the cyclic prefix time is made 1.5 $\mu$S (i.e. >dominant CATV echoes) this represents <0.5% bandwidth overhead for a typical OFDM modem. This cyclic prefix is simple with negligible cost. Furthermore, the cyclic prefix allows for some time domain symbol drift, with no orthogonality spectral leakage noise penalty.

With an OFDM modem the signal power in a CATV channel is divided equally amongst each sub-carrier. The noise, and signal powers scale down to give the same signal to noise ratio (SNR) for individual sub-carrier element as a SCM modem would have across the same channel bandwidth.

As mentioned above, a primary CATV ingress source is 60/120 Hertz types of broad band impulsive emissions from electric motors. Impulsive noise is spectrally like a random comb generator, with power decreasing with increasing frequency. This broad band ingress is generally identified by interference with a fast variation with time (e.g. 10 uSec spike repeated at 360 Hz). This form of interference originates from electrical arcing or the ionization of air. Impulse interference is more of a problem at the low end of the return band (5 to 18 MHz).

OFDM is more robust against time domain impulse interference due to its long symbol time, which tends to average out these quick transient effects. Classical impulse noise is spread uniformly across a communication's channel (just like thermal noise) so the bandwidth of a channel is directly proportional to the power level of the impulse. Therefore, the SNR scaling concept also applies to signal to impulse powers ratio (SIR) within an RF channel. So the SIR ratios are the "same" for SCM, and MCM systems:

Since the Impulse Noise, and Signal powers are proportional to bandwidth, $$SIR_{scm} = SIR_{sc} \text{ dB} \qquad (14)$$

Where,

"SIRscm" is Signal to Impulse ratio of SCM signal in RF channel

"SIRsc" is Signal to Impulse Ratio of OFDM sub-carrier

An OFDM system has a much longer symbol duration to average-out short time impulse spikes, while a SCM modem will lose multiple symbols. For example, a 10 $\mu$S impulse during a 500 $\mu$S symbol time would reduce a noiseless channel to approximately 34 dB SNR (i.e. signal valid for 98% of symbol integration time). This would degrade a 33 dB CATV channel to approximately 30 dB, which would still achieve a bit error rate of better than $10^{-10}$. OFDM has natural impulse ingress immunity before any forward error correction coding (FEC) scheme is applied to the channel.

Another primary ingress source is narrow band amateur (HAM), CB and short wave audio broadcasts, in the 5–27 MHz band. Distant short-wave broadcasts tend to affect the entire CATV plant, while HAM, and CB ingress are localized problems. This narrow band ingress is generally identified by interference with a slow variation with time (but the ingress does vary). This ingress enters the CATV plant generally from the customer premises usually from poor coaxial cable connections.

Since OFDM has very much lower sub-carrier power levels they are individually more vulnerable to discrete carrier jamming than high level SCM signals. However, individual sub-carriers can be remapped to a clear channel. Furthermore, these narrow band jammers tend to stay in one spectral area for a long time (minutes to hours), so remapping OFDM is effective. Also, signal cancellation technology, or sharp filters can be used to remove the narrow band jammer bandwidth at the Head End. By contrast, complete SCM channels can be rendered useless by a single narrow band interference signal.

Return CATV plants typically have a 33 dB video carrier to noise ratio (CNR) in 4 MHz of RF bandwidth (approx. 2000 home Node). This CNR allows 32-QAM upstream with a bit error rate (BER) of better than $10^{-11}$ with no FEC. Removing FEC significantly lowers the modem cost, and power consumption. The SNRs downstream are typically higher so the same argument holds. However, current FEC technology can be used to increase the capacity of a 32-QAM channel to 128-QAM, which allows the cable operator to maximize his bandwidth packing by another 2 bits/Hz with extra capital cost.

Running concatenated FEC (Forward Error block correction coding, plus convolutional Trellis coding ) can improve the link margin by 6 dB optimistically, which is not currently required with the CATV SNRs. The specified $10^{-10}$ BER is met with 29 dB SNR on the sub-carriers, which gives the system design 4 dB of margin to allow for typical CATV plant variations, and gives an SNR window to detect ingress before the channel is out of specification.

Actual CATV experience indicates very consistent return path SNRs with variation less than +/–1.5 dB in a typical installation, unless an ingress event occurs. Narrow band ingress generally takes out sub-carriers which have to be remapped immediately, while OFDM is relatively immune to impulse ingress.

An OFDM modem can put out very large time domain impulses if the sub-carriers are not randomized. Therefore, OFDM sub-carriers are dynamically scrambled to avoid large time domain voltage peaks which minimize non-linear distortion effects.

All return band OFDM modems should be individually phase-locked to the Head End by a remote synchronization algorithm, to ensure the return signal is received orthogonally at the Head End. The Remote modem FFT is smaller, only having to process the subset of sub-carriers being received.

To reduce the demodulator complexity, a dedicated pilot sub-carrier is added to the OFDM spectrum by the transmit IFFT algorithm. The power of the pilot is less than 0.4 dB of the total spectrum of a 256 KB/s modem, but this power ratio decreases proportionally with higher data rates. Having continuous pilots allows the downstream receivers to track out TV tuner phase noise variations in real time, which in turn allows each sub-carrier to achieve its maximum signal quality.

A practical modem has a net 256 Kb/s payload requiring 65 KHz of RF bandwidth (4 bits/Hz). This can handle 4 unblocked 64 kb/s uncompressed data or telephony channels. These modems can be installed to build larger OFDM structures with no RF guard bands. This modem can be software modified to a single 64 Kb/s (16.25 KHz of RF bandwidth) and can co-exist with adjacent larger modems.

The IFFT modulator is implemented with a stand-alone digital signal processor (DSP). The DSP takes in a serial bit stream and scrambles the stream on a subscriber basis. This serial bit stream is broken into 500 $\mu$Sec parallel data sets to feed the IFFT (150 bits for 30 sub-carriers using 32-QAM). Each tone uses 5 bits of this data to map 1 of 32 possible QAM signal vector values to the tone.

All transmitter unwanted spurious emissions are measured 55 dBc below the average QAM sub-carrier levels (That would be 90 dBc below video), and no expensive analog filters are required. The signal is up-converted, and gain is set by the controlling DSP. The current transmitters allow for 40 dB of plant variation with maximum output power of 55 dBmV, assuming a 6 MHz bandwidth. A small modem's power is reduced linearly by the bandwidth reduction ratio. Furthermore, the remote transmitters are designed to allow modems to be deployed in all consecutive modem frequency channels with the noise build-up controlled.

The receiver uses a single analog to digital converter following a sharp IF band pass anti-aliasing filter to sample the signal. This IF is sub-sampled at more than four times the IF bandwidth from the CATV RF tuner. The final conversion to baseband is completed digitally with a set of In-phase and Quadrature-phase mixers (I&Q), with the mixer sum frequency products being digitally filtered again.

High speed dedicated FFTs (Fast Fourier Transform) ICs (Plessey, etc) in the headend minimize the number of modems required in the headend, because each FFT frequency bin decodes one return band QAM modulated tone. One modem takes up 1 MHz so six modems can be fitted in an NTSC channel, and eight modems in a PAL channel. The fine (2.03125 KHz) spacing relaxes the 1 MHz channel filtering requirements naturally to ensure no interference to adjacent television channels. This system allows the CATV operator to do incremental builds on the headend 1, and the subscriber nodes for low penetration systems. The headend modem can be built up in 1 MHz steps but can be activated in 16.25 KHz single DS0 increments.

The OFDM modulation scheme employed is spectrally efficient (bits/Hz). The low symbol update rate due to the multiple tones means the RF echoes and inter-symbol distortion are not a problem, and a complex gate intensive equalizer is not required. Since multiple tones are used to transmit data, even if tones are lost due to ingress noise, data can still be recovered with a block Reed-Solomon error correction code (losing 10–15% in overhead). Alternatively, the lost tones can be identified and simply not used (Extra frequency bins will be provided). Initially a conservative 4.0 bits/Hz spectral data packing is proposed although it may be possible that this number can be increased.

The RF channel filtering on these tones is simple because it is not necessary to filter each Sinx/x individual QAM or VSB spectrum from each tone, because the frequency spacing is set such that these lobes have no effect on the adjacent channel. Furthermore, this orthogonal spacing (in time and frequency) ensures data clock synchronization of the modems at the headend which eases the cross point DS0 switching requirements at the headend.

The lower update rate means a simple microcontroller can complete the QAM receiver phase/data synchronization and AGC processes. The subscriber modems achieve frequency lock using a transmitted pilot tone from the headend (extra frequency bin), and the headend receiver must send commands to the subscriber modem to step the received signals into phase lock at the headend. The headend microcontroller progresses through the FFT table on a sample by sample basis, to always keep the remote modems in synchronization.

The Curbside and Subscriber IFFT/FFTs modulators/demodulators 15, 16 are small (8 to 128 tones) which can completed by a simple low cost single microcontroller.

The fall capacity CATV telephony modem system consists of 12 headend (13 with spare modem), and 48 Curbside modems (4 Curbside units per headend modem). The system broadcasts telephony/data downstream in the 50–750 MHz cable band, and upstream in the 5–42 MHz RF band (FIG. 5). Each headend modem is designed to broadcast and receive up to 544 individual signal tones spaced 2.03125 KHz apart. The curbside modems transmit and receive up to 128 tones spaced at 2.03125 KHz spacing.

Each tone is normally be modulated with 32 QAM to achieve 5 parallel bits per tone symbol. Since the symbol update rate is 2 KHz 10 Kb/s data transfer per tone is achieved. However, one headend master pilot tone is available from each headend modem (12 tones), and one DS0 pilot tone is allocated for each single DS0 modem (64 tones in 1 MHz). The headend master pilots also require a symmetrical guard band (15–16 tone bins) to ensure a CSU or SSD can find the appropriate pilot frequency bin, using a low cost crystal reference (+–100 ppm over temperature) in the remote units. The twelve headend master pilots also ensure system redundancy for jammed downstream pilots.

The headend pilot tones are used to initialize remote modems 12 to their appropriate frequency band, and to calibrate the remote frequency errors at start-up. The DS0 pilots are used to control signal tracking parameters to maintain FFT data centering, to control amplitude levels, and carrier phase lock adjustments as will be described in more detail below. Furthermore, the DS0 pilots are also used as spare tone slots on larger remote modems to map around narrow band ingress without reassigning new frequency bands ( For example a 4-DS0 modem has three spare pilots which can be placed coincident with narrow band audio SW broadcasts to map around ingress without changing the modems frequency assignment). All pilots use QPSK modulation to achieve a baud rate of 4 Kb/s per tone. QPSK is employed to decouple amplitude control systems, from the carrier/data tracking loops, to simplify the DSP design.

In a practical example, the headend modem tone budget is as follows:

1. 12×64-DS0 Modems per Headend
2. 4 CSUs per Headend Modem (or 48 CSUs per System)
3. 544 tones per Headend Modem including 64 DS0 pilot tones
4. 1 Headend master pilot tone per Modem (32 bins in center)
5. 15–16 master pilot guard band per Modem (32 bins total)
6. Tone bins per Headend Modem=4×8×16+32=544 tone bins total
7. Raw Modem capacity=4×7×16×2×5=4.48 Mb/s in 1 MHz RF
8. Headend Raw capacity=12×4.48=53.76 MB/s in 12 MHz RF The curbside modem tone budget is as follows:

1. 48 CSU Modems per Headend
2. 4 CSUs per Headend Modem
3. 128 tones per CSU including 16 DS0 pilot tones
4. Raw Baud capacity=16×7×2×5=1.12 Mb/s NB. An CSU modem has same tone plan 16-DS0 SSD.

The Single Subcriber Drop (1-DS0) modem tone budget is as follows:

1. 768 SSD Modems per Headend
2. 64 SSDs per Headend Modem
3. 8 tones per SSD including 1 DS0 pilot tone
4. Raw Baud capacity=7×x×2×5=70 Kb/s NB. An N-DS0 modem is made up of N groups of 1-DS0 tones The OFDM modulation is configured such that all the tone symbols are transmitted and received synchronously at the headend. However, the remote modem transmission and receive times are not generally coincident. This inherent headend remote control synchronization makes the DS0 cross connect telephony switching simple. However, the CSU/SSD modems generally transmit at different times to account for the various CATV transport delays. This slewing of the CSU/SSD modems data times (+–250 μSec), and carrier phase must be fine (+–22.5 degrees maximum) controlled by the headend modem 1 using the downstream pilot tone channel, because this is the only location where this error can be detected. Furthermore, the return adjustments of signal power, data times, and phase slip can only be simply adjusted by remote control from the headend modem 1 and all these updates use the DS0 pilot as a direct message pipe to the remote transmitter.

Synchronous transmission is assured from the headend due to hardware IFFTs in each of the twelve modems which can each generate the 544 downstream orthogonal frequency sources (6528 Total). The frequency sources are space 2.03125 KHz apart with a symbol time of 500 microseconds ( implies a 7.69231 μSec cyclic prefix time guard band between OFDM symbols).

Figure 9:
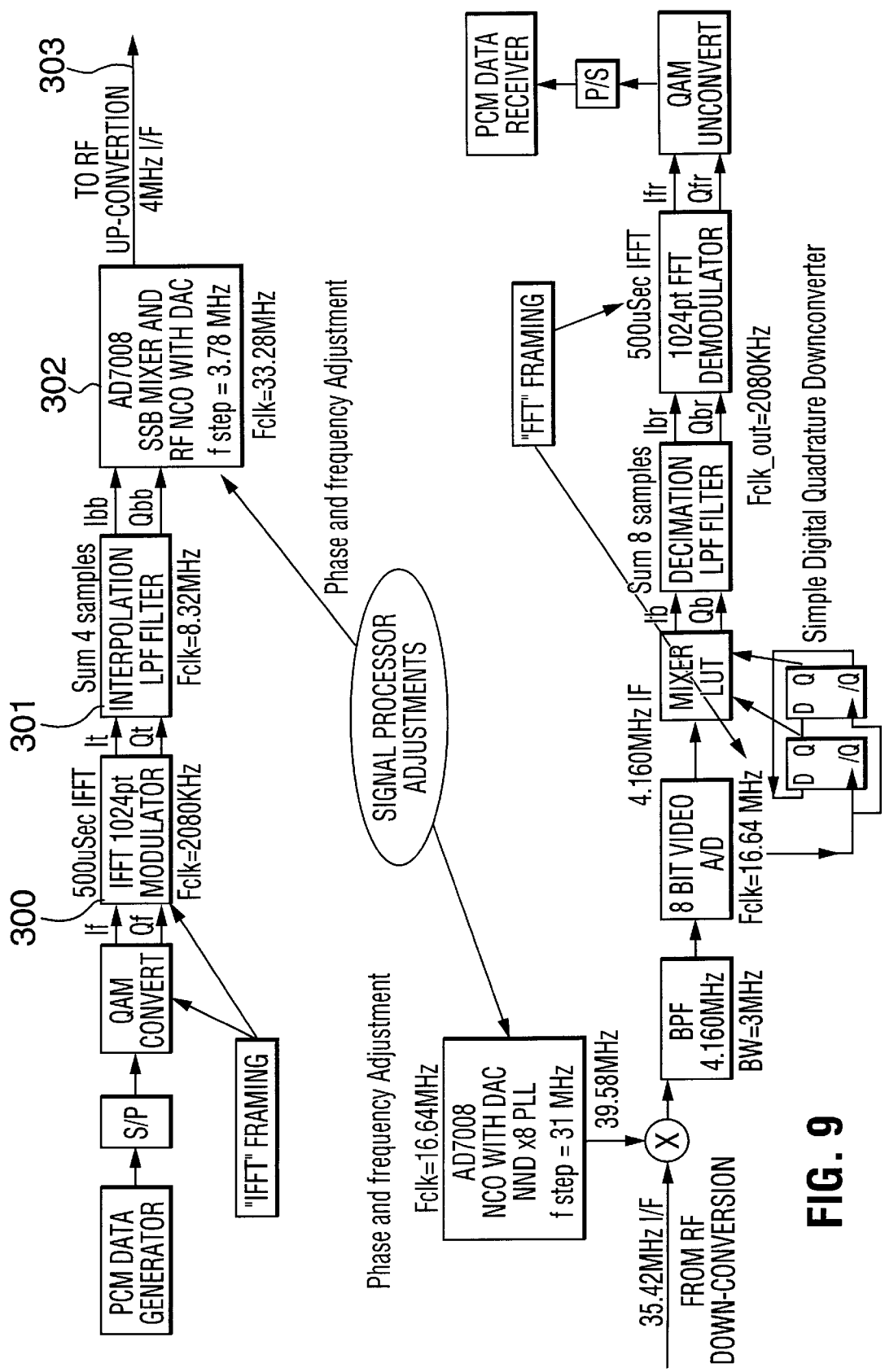
FIG. 9 shows an example of the signal processing in the Headend unit.
Figure 10:
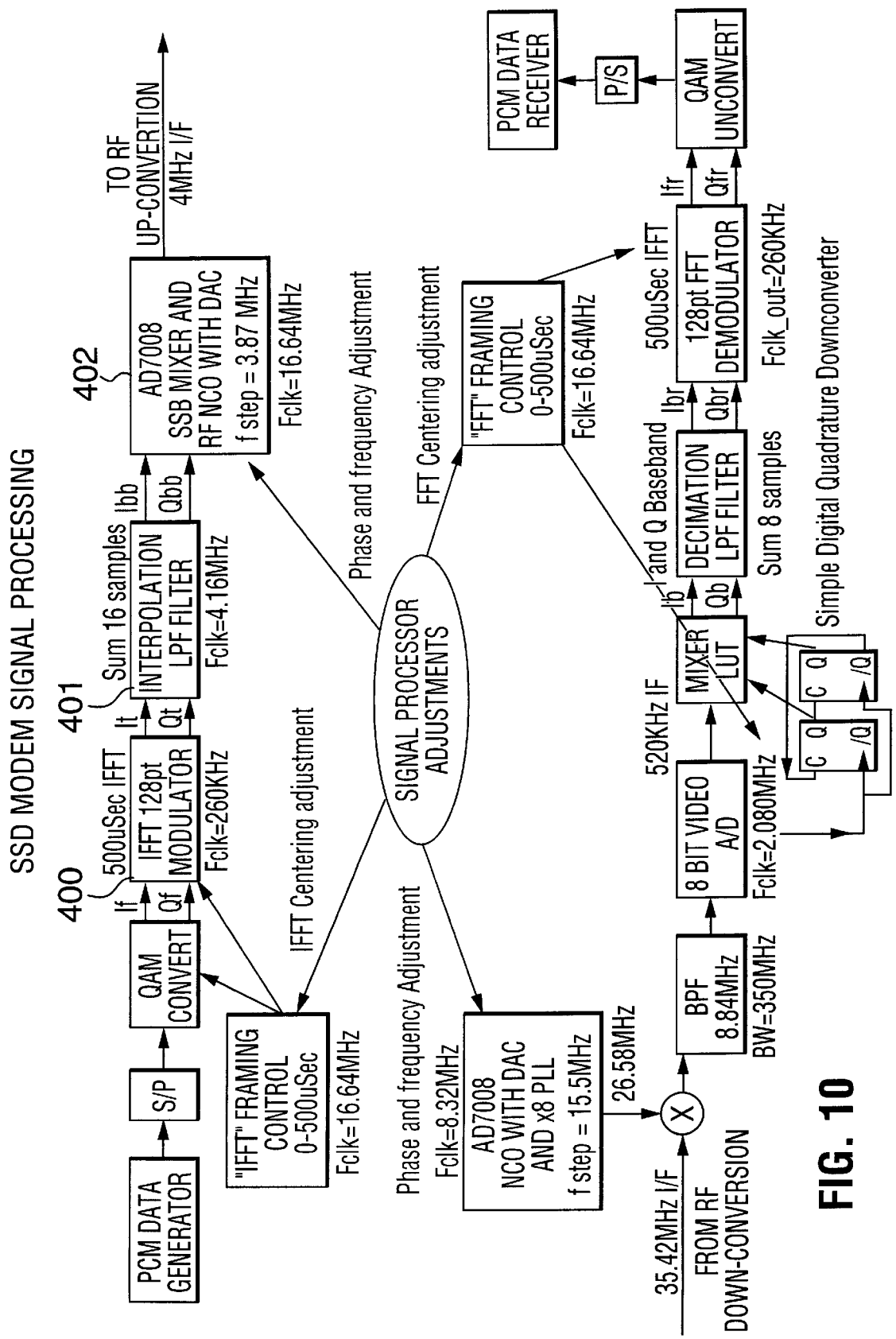
FIG. 10 shows an example of the signal processing in a single drop subscriber unit.

The headend transmitter consists of a hardware Complex 1024 point IFFT 300, shown in FIG. 9, which generates a continuous time series of the baseband OFDM signals. This time series consists of a sequence of digital numbers. The time series has an update rate of 2.08 MHz with a real, and an imaginary baseband signal component. The IFFT symbol update period for this time series is 500 μSec, which means a QAM setting for each tone remains constant for this time duration. Only the middle 544 of the 1024 tones are modulated, while the outside tones are set to zero amplitude values to ease signal filtering requirements, and to minimize image foldover distortion of the OFDM spectrum. The Master Pilot for this modem is broadcast at the center of the spectrum, or the DC frequency bin of the IFFT. The lower frequency bin of this complex output are approximately −1.04 MHz, while the upper bin is centered at +1.04 MHz. The 544 bins of interest will cover the −552 KHz to +552 KHz range.

These series of numbers are interpolated to a higher sampling rate of 8.32 MHz, using a simple integrating comb digital lowpass filters 301. These samples are then put through a complex number digital mixer 302 to produce the first intermediate frequency of 5.92 MHz (master pilot location). A digital complex number multiply is executed to get a SSB mixer operation, which in turn will relax the analog filtering requirements, by producing only the upper side band of the mixing operation. The local oscillator for this mixing operation is produced by a 32 bit NCO which allows for 3.75 milliHertz frequency adjustment with the accuracy of the 33.28 MHz telephony frequency reference. The output of this SSB mixer is converted to analog signal. The SSB mixer, the 32 bit NCO, and the 10 bit output DAC are contained in one integrated circuit which makes this implementation economical.

This first IF is then up converted 303 to a 44 MHz standard second IF and filtered. This second IF is then up converted to the 50 to 750 MHz cable band to the selected 1 MHz headend modem frequency band. There are twelve transmission frequency choices which will be governed by the system network manager.

The 4-DS0 Single Subscriber Drop transmitter (FIG. 10) consists of a DSP based Complex 128 point IFFT 400 which generates a continuous time series of the baseband OFDM signal. This time series consists of a sequence of digital numbers (not analog at this point). The time series has an update rate of 260 KHz with a real, and an imaginary baseband signal component. The IFFT symbol update period for this time series is 500 $\mu$Sec, which means a QAM setting for each tone remains constant for this time duration. Only the middle 32 of the 128 tones are modulated, while the outside tones are set to zero amplitude values, again to ease signal filtering requirements, and to minimize image foldover distortion of the OFDM spectrum. The Subscriber drop Pilot for this modem is broadcast at the center of the spectrum, or the DC frequency bin of the IFFT. The middle frequency bin of this complex output is DC, while the outside bins is are +30.5 KHz and −32.5 KHz. The 32 bins of interest will cover a 65 KHz (32×2 KHz×130/128).

These series of numbers are interpolated 401 to a higher sampling rate of 4.160 MHz (260 KHz×16), using a simple comb digital lowpass filter combination. These samples are then put through a complex number digital mixing operation 402 to produce the first intermediate frequency of 5.92 MHz (pilot location). A digital complex number multiply is executed to get a SSB mixer operation which will relax the analog filtering requirements, by producing only the upper side band of the mixing operation. The local oscillator for this mixing operation is produced by a 32 bit NCO, which allows for 3.87 milliHertz frequency adjustment with the accuracy of the 16.64 MHz subscriber drop frequency reference (+−100 ppm). The subscriber drop frequency accuracy will track the headend telephony 16.384 MHz (256×8 KHz) reference, when the receiver frequency lock is achieved by the subscriber drop receiver PLL. The output of this SSB mixer is converted to analog signal. The SSB mixer, the 32 bit NCO, and the 10 bit output DAC are contained in one integrated circuit which makes this implementation economical.

This first IF is then up converted to a 44 MHz television standard second IF and filtered. This second IF is then down-converted to the 5 to 42 MHz HF band to the selected 65 KHz subscriber drop modem frequency band. There are 64×12 transmission frequency band choices plus twelve return master pilot frequency slots, which will be governed by the system network manager.

The 65 KHz modem channel selected in the 5–42 MHz HF input is up-converted to a 44 MHz standard television IF and filtered at Headend modem. The higher IF is picked to relax the image filtering rejection requirements on the receiver front end. This first IF is then filtered to approximately 1.5 MHz bandwidth ( for 16×4 DS0 modems in parallel) . This IF is then sub-sampled with one ADC at 33.28 MHz to produce a real time series of the selected modem channel, centered at a 10.72 MHz digital IF frequency. This data stream is quadraturely converted to baseband samples then decimated to a 2.080 MHz and to filter the signal. This time series is applied to a hardware complex 1024 point FFT (i.e. 500 $\mu$Sec sampling duration) to produce the desired data output series from the correct group of middle 32 tone values. The headend modem uses only 544 return band tones of the 1024 tone FFT to ease the receive filter requirements and to prevent alliasing fold-in problems.

The 4-DS0 Single Subscriber Drop receiver modem channel selected in the 50–750 MHz VHF input is down converted to a 44 MHz television standard IF and filtered. This first IF is then down converted to a 2.60 MHz frequency band and filtered to approximately 150 KHz bandwidth. This IF is then phase quadrature sampled with one ADC at 2.08 MHz to produce a 520 KHz digital IF. The IF is converted to baseband with phase quadrature local oscillators to produce real and imaginary time series of the selected modem channel. Then the baseband samples are comb filtered to allow a decimation the sampling rate to 260 KHz. This time series is applied to a hardware complex 128 point FFT (i.e. 500 $\mu$Sec sampling duration) to produce the desired data output series from the middle 32 tones values. The 4-DS0 SSD modem uses only 32 return band tones of the 128 tone FFT to ease the receive filter requirements and to prevent alliasing fold-in problems.

Figure 11:
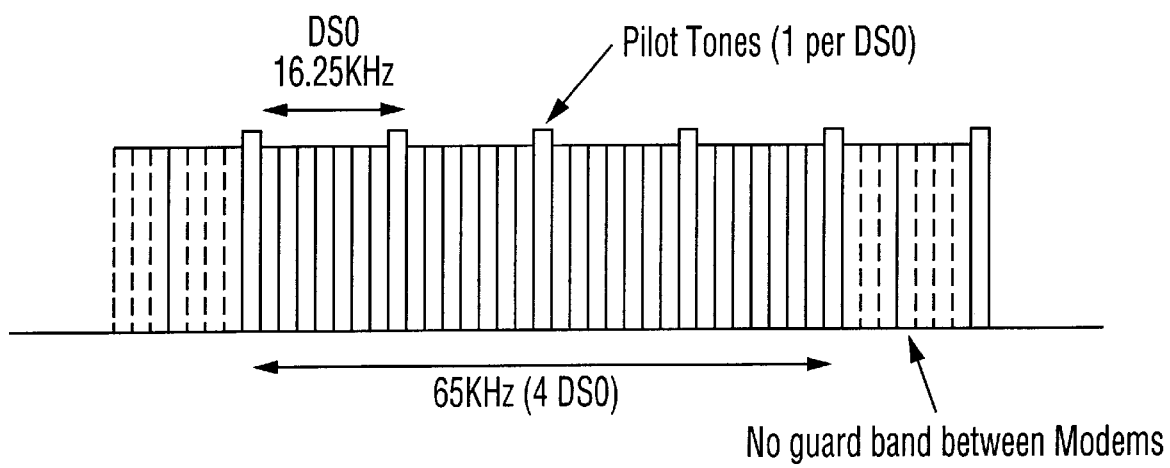
FIG. 11 shows the 4-DS0 Single Subscriber Drop Curbside Modem tone modulation plan (32 tones in total using 65 khz of RF bandwidth)

Detailed specifications of the modem in an exemplary embodiment are as follows:

1. The Headend modem consists of up twelve individual modems
2. 4-DS0 modem FFT/IFFT is a complex 128 pt and the middle 32 bins are used.
3. The DS0 Pilot is located at baseband with 15–16 tones on either side.
4. Symbol time is 0.5 milliseconds (nominal 2.03125 KHz tone spacing).
5. Each 32 QAM tone has nominal data rate of 10 Kb/s.
6. The 4-DS0 Modems have following specifications,
   Modem card nominal bandwidth is 65 KHz assuming 32 tone spectrum
   Cyclic prefix is 7.692 $\mu$S ( 2/130*500 $\mu$Sec)
   Cyclic prefix increases sequence from 128 to 130 time samples in 500 $\mu$Sec
   Modem reference clock is 16.64 MHz
   ST-BUS clock is synthesized by modem reference clock(/65)(*8)
   128 point Complex FFT for the OFDM receiver
   Decimation filter hardware operates on a continuous basis
   Decimation filter reduces RF sampling rates from 2.08 MHz to 260 KHz
   Decimation inputs are from phase quadrature digital mixer outputs
   Receiver has one ADC which is fed into two phase quadrature downconverters
   128 point Complex IFFT for the OFDM transmitter
   Interpolation filter hardware operates on a continious basis
   Interpolation filter increases RF sampling rates from 260 KHz to 4.16 MHz The baseband output is upconverted with Single Side Band digital upconverter One AGC Control algorithm for each receiver and transmitter RF transmit data has randomization algorithm for peak power control RF receive data un-randomization algorithm QAM look-up table for 32 tones transmitted QAM look-up table for 32 tones received FIG. 11 shows the spectral plan for this modem. There is one pilot tone per DS0 channel, each of which occupies 16.25 KHz.

The following paragraphs discuss typical cable and signals impairements that the system must cope with.

The cable time delay of a CATV system varies approximately 0.1 % per ° C. A 20 mile cable run will have a nominal delay of approximately 161 µSec, therefore the delay variation will be 0.161 µSec per ° C. change. Active bipolar amplifiers cascaded in this run will have a nominal variation of 0.001 µSec per ° C. change. Therefore, using 0.162 µSec per ° C. is a good approximation of CATV delay variations.

The maximum temperature gradient a CATV system will see is 20° C. per hour. Therefore, we can expect to see 0.9 nS variation in cable delay in a second duration of the above temperature gradient. A return band signal at 40 MHz will experience a 13° phase shift due to this temperature gradient. 32 QAM levels have a mean phase difference of 14° which means this induced phase shift due to freewheeling is significant. Therefore, we cannot allow a return band signal to free run for a second without phase corrections. A return band phase variation of 0.5° seems like a good goal, which implies that we must monitor phase errors at least every 38 mSec to allow for CATV delay variations versus temperature.

The drop cable and TAP loss variation of a CATV system varies 0.20% per ° C. The SSD return band transmitter must overcome cable drop losses to the home using feedback signals from the headend modem. These losses have a nominal variation of 15 to 35 dB depending on where the SSD is located in the cable cascade. Therefore, in a 20° C. per hour temperature gradient a return band signal variation up to 0.0004 dB in a second can be expected. However, the SSD transmitter itself will have 0.2 dB power variation per ° C. which corresponds to a 0.001 dB variation in a second using the above temperature gradient. The 32 QAM levels are a minimum of 1.2 dB apart which indicates there should be no problem with the return band levels at one second free wheeling intervals.

Since the sleeping SSDs are continuously phase locked to the HEU pilot, there should be a short term frequency drift of the HEU for the 161 µSec return path time. The short term drift of the HEU will be approximately 5*10^(−11) in one second. Therefore, the 40 MHz return signal will drift 0.322 µHz in this time, which corresponds to negligible phase shift error due to this component.

Since the sleeping SSDs will be continuously phase locked to the HEU pilot we must track out the short term frequency variations of the combined HEU and SSD frequency references to achieve HEU return band frequency accuracy. The short term frequency variations we can expect is 4.125 Hz on the 750 MHz downstream carrier (750*(10^6) *55*(−10)). This means that the SSD PLL tracking loop bandwidth must be larger than this frequency to track these frequency variations. The tracking loop bandwidth can conveniently be set at at 25 Hz to achieve optimum tracking of these signals.

A 25 Hz loop bandwidth corresponds to a noise bandwidth of 83.25 Hz (assuming a second order loop with a 0.707 damping factor). The pilot signal to noise ratio expected receive will be 20–40 dB in a 2 KHz bandwidth. This means the carrier that will be track will have a signal to noise ratio of 40–65 dB in the 25 Hz tracking loop. Therefore, the minimum signal noise ratio received in the tracking loop will be 40 dB. This corresponds to a 58.3 mHz residual FM on the carrier tracking loops. This frequency error at 750 MHz will cause a 3.11 mHz residual FM on the return band 40 MHz carrier. Therefore, if the return band is freewheeled for one second, a 1.12° phase shift can be expected, which is too high. This effect limits the return band update rate to approximately two times a second.

The SSD 32 bit carrier NCO has a minimum frequency step of 7.63 mHz which will give us a 2.74° phase shift in one second without corrections. This source of phase error limits the return band update to 6 times a second.

The SSD has a low cost crystal oscillator with a temperature drift of 0.7 ppm per ° C. Therefore, one second duration of a 20° C. per hour temperature gradient will give us a 0.004 ppm per second frequency standard drift. This drift corresponds to 56° phase shift of the 40 MHz. However, this frequency shift is not a problem because the downstream Pilot PLL tracking loop will suppress this variation along with the short term Allen variance. However, this new frequency variation imposes an additional 2.9 Hz frequency variation at 750 MHz, which means the tracking loops must track approximately 7 Hz variations, which can be achieved with the above PLL described.

The system transmits from a sleeping SSDs at least every 38 mSec to ensure OFDM synchronization. This allows one pilot frequency bin to keep a maximum of 19 sleeping SSDs in synchronization. One second return pilot update rates will fail mainly due to the CATV plant delay variations versus temperature, and secondly, due to the short term frequency variations. However, it seems that return pilot tone frequency bins can be shared. This update rate also indicates that each active SSD will require approximately 1.263 Kb/s of downstream data from the HEU to maintain upstream synchronization and signal level controls (ie. 48 bits of data every 38 mSec). The downstream pilot has an 8 Kb/s data channel that should be able to service approximately 6 SSDs for return band adjustments only.

Therefore, one Pilot shared amongst four SSDs or one MSD with a 25 mSec SSD update is the simplest solution. This ratio gives each SSD pilot a 2 Kb/s data channel in both the upstream and downstream directions which leaves at least 0.737 KB/s for network management on the pilot tone for each SSD downstream and almost the full 2 Kb/s upstream.

The OFDM modem tracking loops will now be described in more detail. These comprise a dc offset loop for the headend (HE) and subscriber drop (SD), an automatic gain control (AGC) loop for the HE and SD, a carrier tracking loop for the HE and SD, the symbol tracking loop for the SD, and the remote symbol tracking loop for the HE.

Receiver tracking loops are required to synchronize the receiver to the incoming RF signal so as to properly demodulate the incoming signal in order to receive the transmitted information.

There are four tracking loops in the 4-DS0 modem. Three are standard loops required in any modem: carrier tracking loop, symbol tracking loop, and AGC loop. These loops operate on the incoming data and make corrections by writing data to the digital hardware on the 4-DS0 modem described. The fourth loop is the dc offset loop and is completely internal to the DSP.

Figure 12:
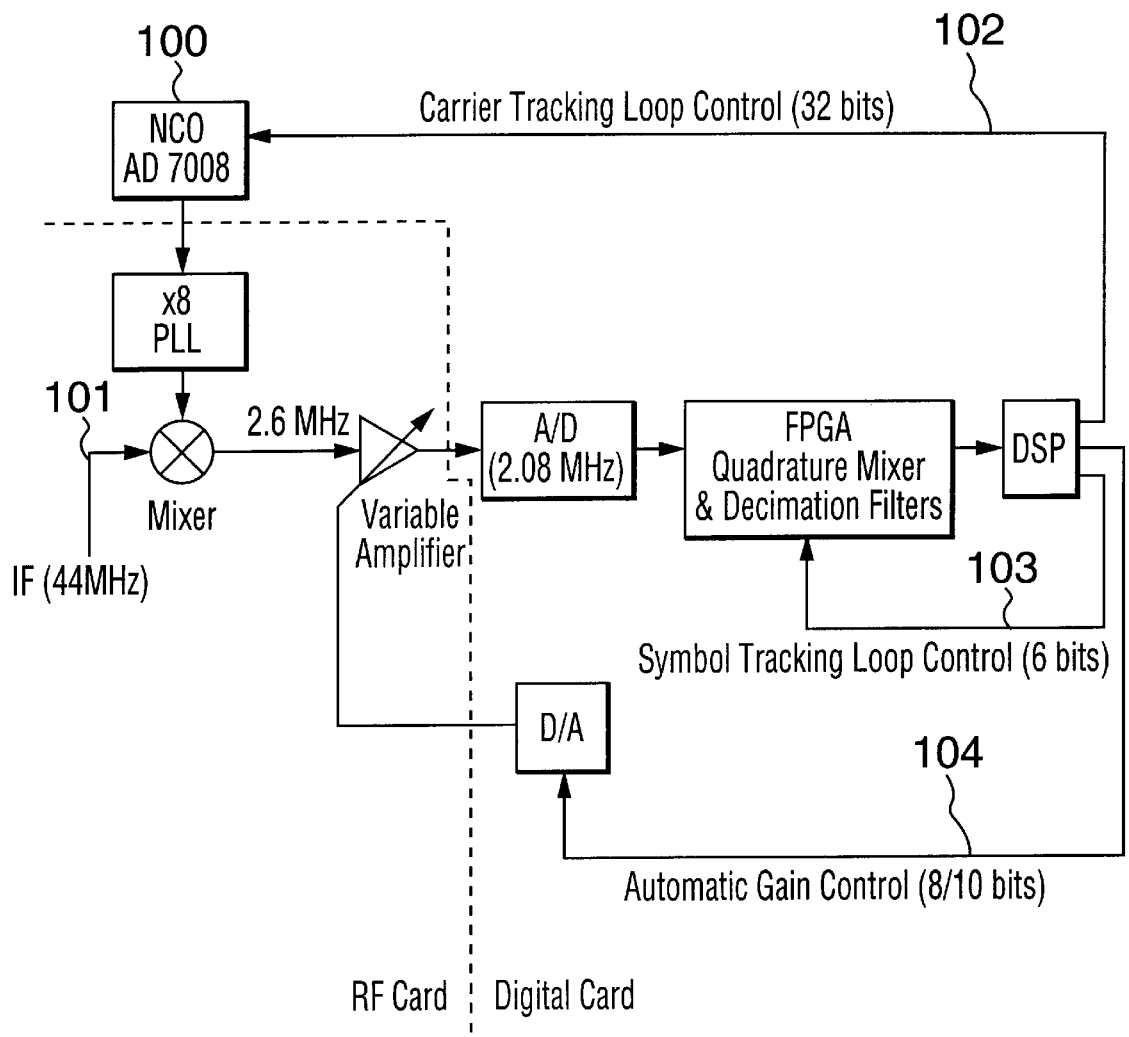
FIG. 12 is a simplified block diagram of a modem receiver.

The first of the four tracking loops is the carrier tracking loop shown in FIG. 12, which is a simplified block diagram of a modem receiver. The carrier tracking loop 102 synchronizes the frequency and phase of the local oscillator 100 to the frequency and phase of the incoming carrier 101. If the receiver local oscillator 100 is not phase-locked to the incoming signal 101, the receiver will suffer a degradation due to lack of orthogonality between carriers.

The purpose of the symbol tracking loop 103 is to allow the receiver to know which of the incoming samples correspond to the current symbol. If the receiver is not properly aligned in time, it will be processing information from more than one symbol. This will cause a degradation due to inter-symbol interference, ISI.

The AGC loop 104 controls the level of the signal at the front-end of the modem. The signal must be driven to the proper level since the amplitude of the signal is used to extract information.

The dc-offset loop is used to measure and compensate for dc offsets. DC-offsets arise from the analog to digital converter, A/D, picking up harmonics of 520 kHz, e.g.16.64 MHz, 2.08 MHz, 66.56 MHz. The effect of the DC offset is the addition of a small vector to the pilot tone.

The carrier tracking loop 102 must be able to track out dynamics that are introduced by RF mixers. The most dramatic dynamics are caused by temperature changes. The maximum temperature gradient a CATV system will see is 20° C. per hour.

A typical temperature drift specification for a low cost crystal is 0.7 ppm per ° C.

This will give a frequency drift of 0.004 ppm per second. At 750 MHz this will give a frequency drift of 3 Hz/s. Therefore the carrier tracking loop must be able to track frequency drifts of at least 3 Hz/s. Testing of the carrier tracking loop was carried out using frequency drifts of 7 Hz/s.

The other requirement is minimizing phase jitter. The goal for phase variation is <0.5°.

The symbol tracking loop 103 must be able to compensate for the different symbol rates due to different reference clocks in the transmitter and receiver. The goal is to be able to correct for a +/−100 ppm difference between transmit and receive reference clocks with a tracking error of <60 ns.

The automatic gain control loop 104 compensates for variations in the gain of the channel between a receiver and a transmitter. The goal is to be able to control the gain to within 0.15 dB of the desired levels.

Figure 13:
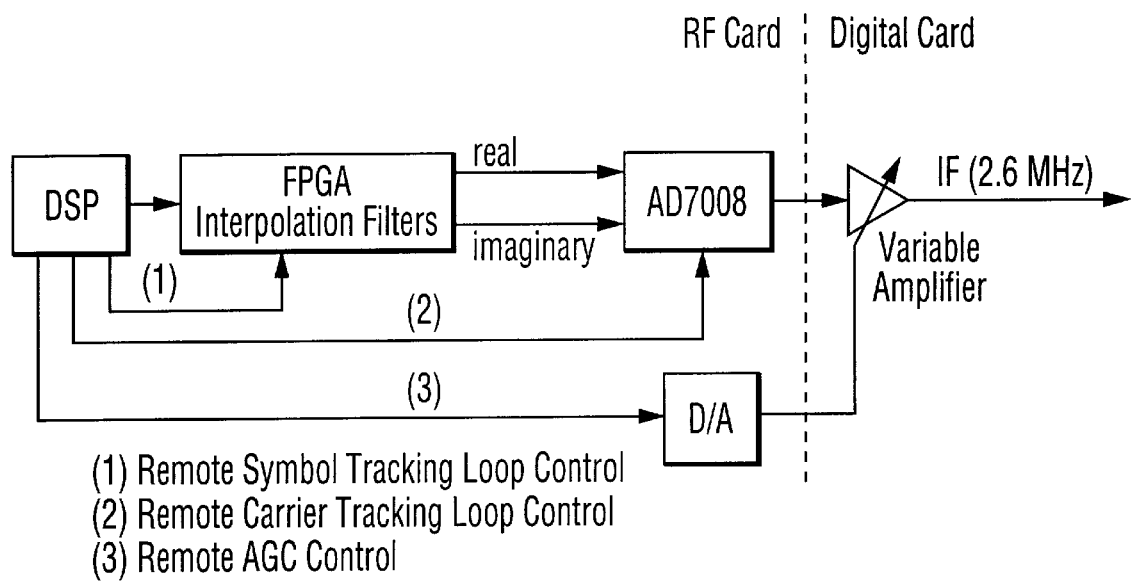
FIG. 13 is a simplified block diagram of a modem transmitter.

FIG. 13 is a simplified block diagram of the transmitter showing the tracking loops.

Figure 14:
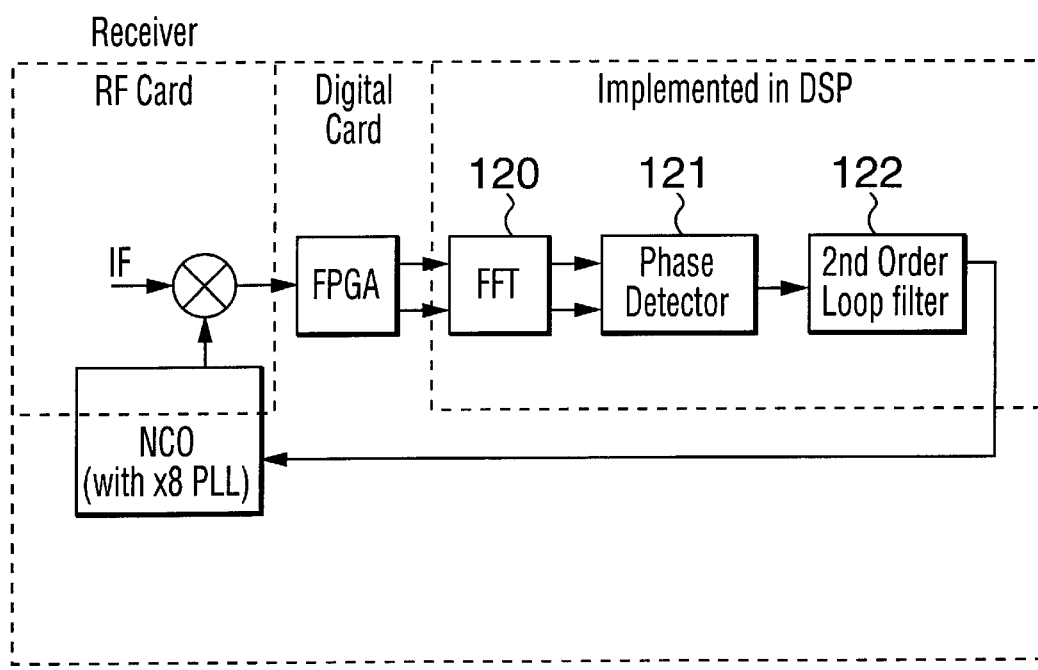
FIG. 14 is a block diagram of a carrier tracking loop.

To be able to allow a HE modem 1 to communicate with several subscriber modems, it is necessary to synchronize all of the SD transmitters. This is carried out by implementing the carrier tracking loop remotely, shown in FIG. 14 remotely. That is the frequency and phase of all of the SD transmit carriers are matched to the frequency and phase of the HE local oscillator. Therefore two versions of the carrier tracking loop will be described, the local carrier tracking loop and the remote carrier tracking loop.

The input to the carrier tracking loop is the dc term at the out put of the receiver's FFT 120. This term is a complex number, I+jQ, where the real part, I, is the in phase component and the imaginary part, Q, is the quadrature component. This vector is passed on to a phase detector 121 where a phase error is calculated. This phase error is then filtered by a second order loop filter 122. The output of the loop filter 122 is fed back to the NCO 100. The NCO 100 in the receiver controls the phase and frequency of the local oscillator used in the RF card to mix the incoming signal to the final IF of 2.6 MHz. In the case of the remote carrier tracking loop the NCO 100 is in the transmitter and it controls the phase and frequency of the local oscillators used in the quadrature mixing to an IF around 5.92 MHz.

The difference between the local carrier tracking loop and the remote carrier tracking loop is the placement of these elements.

The following are the variables that define the carrier tracking loop.

(1) $f_s$—sampling frequency (Hz). The rate at which the loop filter is updated.

(2) $K_{vco}$—Gain of the phase detector (units/radian). The magnitude of the error for a phase error of 1 radian.

(3) $K_f$—Gain of the NCO (radians/s/unit). Gives the change in frequency of the NCO output given a change in the NCO input.

(4) z—Damping factor. Affects the overshoot and the settling time of the control system.

(5) $w_n$—Natural frequency of the loop.

The transfer function of the loop filter is $$F(s) = \frac{1}{s} \frac{\tau_2 s + 1}{\tau_1}, \text{ where } \tau_1 = \frac{K_{vco}K_\phi}{\omega_n^2}, \tau_2 = \frac{2z}{\omega_n}.$$

The carrier tracking loop is a type 2 second order loop. Further details of the loop filter transfer function can be found in Rhode, Ulrich L, *Digital PLL Synthesizers Theory and Design*, Prentice Hall, which is herein incorporated by reference. Once all of the variables for the loop are defined then the parameters of the loop filter can be calculated. The following is a block diagram of the loop filter.

Figure 15:
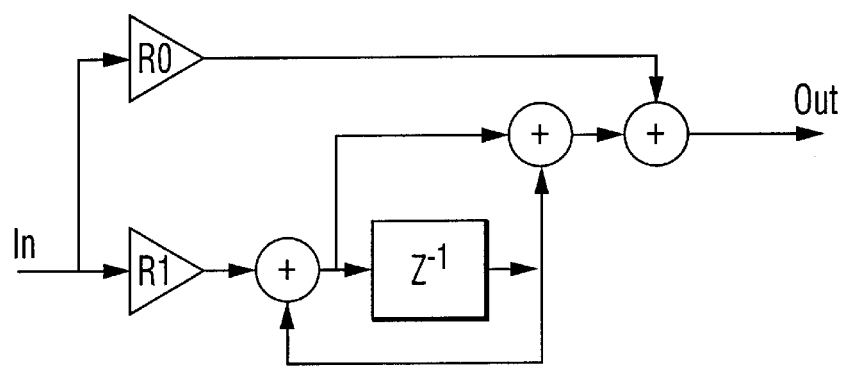
FIG. 15 is a block diagram of the loop Filter for a type 2 second Order Loop.

FIG. 15 is a block diagram of the loop Filter for a type 2 second Order Loop.

There are two loop filter parameters: R0, the AC gain, and R1, the integrator gain.

$$R0 = \frac{\tau_2}{\tau_1}, R1 = \frac{1}{2f_s\tau_2}.$$

The phase detector used is described in *New Phase and Frequency Detectors for Carrier Recovery in PSK and QAM systems*, IEEE Transactions on Communications, vol. 36, No. 9, pp 1035–1043, September 1988.

The subscriber receiver and 4-DS0 HE modems 1 use a local carrier tracking loop. The phase detector and loop filter are both implemented in the same receiver. The required corrections are made to the NCO that provides the local oscillator in the receive path.

Figure 16:
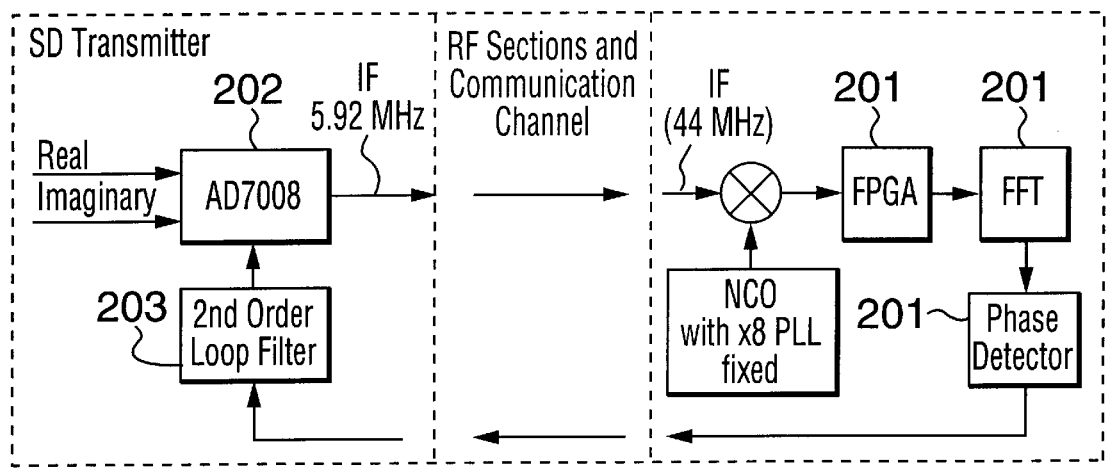
FIG. 16 is a block diagram of a remote carrier tracking loop.

The modems implement a remoter carrier tracking loop for the headend, as shown in FIG. 16. The phase detector 201 is implemented in the HE receiver and is connected to the $2^{nd}$ order loop filter in the SD transmitter over RF channel 204 which consists of pilot tones of the OFDM modulator. The phase errors are transmitted to the subscriber modem on the downstream pilot. The subscriber receives the phase errors and passes that information on to the subscriber's transmitter where the loop filter 203 is implemented. The required corrections are made to the NCO 201 in the transmitter that provides the carrier for carrying out the quadrature mixing.

Figure 17:
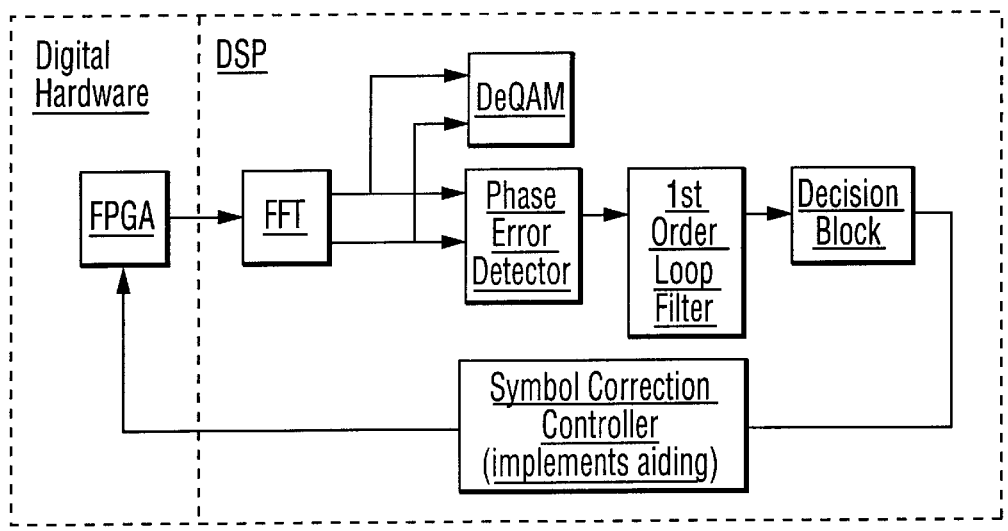
FIG. 17 is a block diagram of the symbol tracking loop.

The symbol tracking loop is shown in FIG. 17. The remote control symbol tracking loop is similar with corrections made in the field using a communication channel similar to that shown in FIG. 16. The symbol tracking loop must keep the receiver symbol rate synchronized to the transmitter symbol rate. The difference in rates arises from the difference in crystal frequencies that provide the clock for the DSPs. In a given symbol period the receiver DSP (Digital Signal Processor) collects 130 samples from the FPGA (Field Programmable Gate Array). The samples are given to the receive DSP at a rate of 260 kHz giving a symbol period of 500 µs and a tone spacing of 2 kHz. The resolution of the symbol timing corrections is □60.1 ns or a 64th of a sample period. A 60.1 ns correction is referred to as a fine symbol timing correction. A correction is carried out when the decision block determines that the output of the loop filter has exceeded a threshold.

The error signal is created from a phase error. When a 60.1 ns error is present in the symbol timing a phase shift will occur on all of the non dc tones. The phase shift on the $n^{th}$ tone is given by the following equation.

$$PhaseError(n) = \frac{(2\pi)(2 \times 10^3)(n)}{16.64 \times 10^6} \text{ radians}$$

$$\text{N.B.}: 60.1 \text{ ns} \approx \frac{1}{16.64 \times 10^6} \text{ s.}$$

The input to the symbol tracking loop is a QAM point from one of the tones at the output of the FFT. Higher frequency tones will generate larger phase errors for the same symbol timing errors.

When a correction is required, it is carried out in the FPGA on the receiver card. In order to make this loop behave like a second order loop, a method referred to as aiding is carried out. The dynamics of the symbol tracking loop does not change very much with time. Corrections must be made at a given rate to synchronize the receiver to the transmitter. This rate changes slowly. Therefore the rate at which corrections are applied is calculated in the DSP and these corrections are made automatically. Therefore symbol timing corrections have two sources: from the loop filter and from the symbol aiding. Without this aiding the symbol tracking loop will track with an unacceptable phase error at higher ppm errors.

The 60.1 ns corrections are carried out in the FPGA where the signal is still at 2.6 MHz. A 60.1 ns shift at 2.6 MHz creates a phase shift of 56.25°.

$$56.25° = 360° \times \frac{2.6 \text{ MHz}}{16.64 \text{ MHz}}$$

This phase shift can be seen even after the signal is mixed down to baseband. Because of the phase shift symbol timing corrections must be carried out during the cyclic prefix. Then measures can be taken to compensate for these phase shifts.

The headend receiver implements all of the blocks in FIG. 17 except for the aiding function and the corrections are not carried out in the receiver FPGA. When a correction is required the headend will transmit the required correction to the subscriber. The subscriber will make the required correction in its transmitter. Since the source of the symbol timing error is the difference between processor clocks, the ppm error is the same in the upstream as it is in the downstream. Therefor the aiding parameters calculated in the subscriber receiver are shared with the subscriber transmitter. The transmitter implements the aiding, helping the remote symbol tracking loop.

The symbol timing corrections made in the transmitter are carried out at baseband. Therefore they do not incur any large phase shifts.

Figure 18:
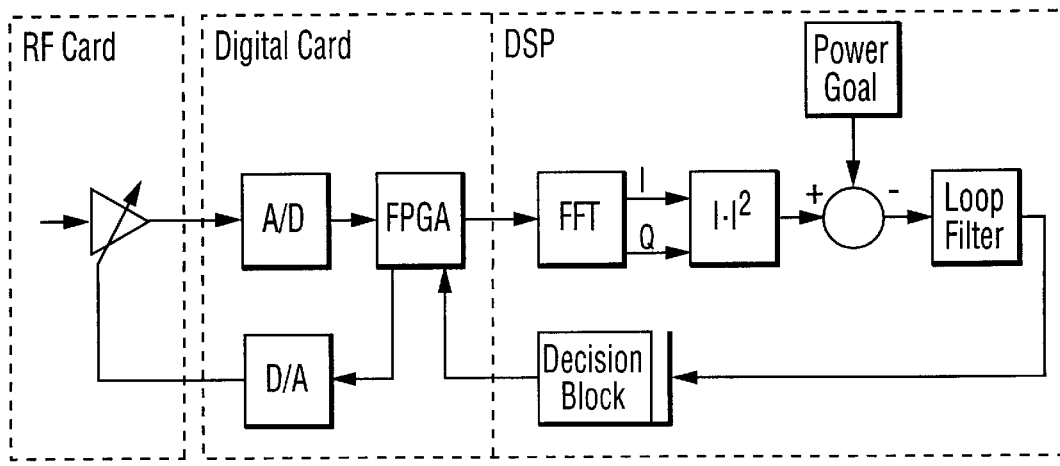
FIG. 18 is a block diagram of an AGC tracking loop.

The automatic gain control loop drives the signal level to a desired value. This is accomplished by driving the power of the pilot tone to a desired level. A block diagram of the AGC loop is given in FIG. 18. The remote control AGC tracking loop is similar with corrections made in the field using a communication channel similar to that shown in FIG. 16.

An error signal is generated by calculating the power of the pilot and subtracting the desired power level. This difference is the input to a first order loop filter. Once the output of the loop filter grows beyond a threshold a correction is made. Corrections are made by incrementing or decrementing a value written to the D/A that drives the variable gain amplifier.

The d.c. offset loop compensates for signals that appear as d.c. offsets at the output of the FFT. There are two versions of the d.c. offset loop, one for the subscriber and one for the headend. They both try to measure the d.c. offset vector and then compensate. The compensation is carried out by subtracting the estimate of the d.c. offset vector from the d.c. tone after the FFT. Without compensation, the d.c. offset would have an effect on the AGC loop and on the carrier tracking loop.

The described invention is merely illustrative of the invention and numerous modifications may be devised by those skilled in the art without departing from the spirit of the invention.

The contents of priority application GB 9510127.5 are herein incorporated by reference.

What is claimed is:

1. A two-way point to multipoint data transmission system comprising an upstream unit, a plurality of downstream units, and a transmission line connecting said downstream units to said upstream unit, wherein at least one headend modem is located at said upstream unit and at least one downstream modem is located at said downstream units, said modems employs multitone orthogonal frequency division multiplexing (OFDM) to establish two-way communication channels between said upstream and downstream units, said OFDM has a tone spacing selected to minimize the ingress of electromagnetic interference at least in the upstream direction, and said headend modem includes a local oscillator and each downstream modems is synchronized with said local oscillator at the headend modem by means of a remote tracking loop.

2. A two-way point to multipoint data transmission system as claimed in claim 1, wherein each subcarrier of the multitone OFDM signal is modulated using nQAM (Quadrature Amplitude Modulation) to maximize the bit packing factor.

3. A two-way point to multipoint data transmission system as claimed in claim 1, wherein the tones are block modulated with an Inverse Fast Fourier transform unit and demodulated with Fast Fourier Transform unit.

4. A two-way point to multipoint data transmission system as claimed in claim 1, wherein said tone spacing is approximately 2 KHz.

5. A two-way point to multipoint data transmission system as claimed in claim 1, wherein said remote tracking loop is a remote phase-locked loop communicating over a remote channel established on said transmission line.

6. A two-way point to multipoint data transmission system as claimed in claim 5, wherein said phase-locked loop comprises a first part at the head end modem and a second part at the downstream modem, said first and second parts of said phase-locked loop communicating over said channel established on said transmission line.

7. A two-way point to multipoint data transmission system as claimed in claim 6, wherein said phase-locked loop includes a phase detector at the headend and a loop filter at the downstream end, said phase detector and said loop filter communicating over said channel.

8. A two-way point to multipoint data transmission system as claimed in claim 5, wherein said remote tracking loop further includes a remote control symbol alignment loop, and a remote control amplitude gain loop.

9. A two-way point to multipoint data transmission system as claimed in claim 5, wherein said remote channel is established over a pilot tone forming part of an OFDM signal.

10. A two-way point to multipoint data transmission system as claimed in claim 1, wherein said downstream modems are located at respective subscriber premises, and each subscriber is allocated a group of tones over which a two-way channel is established with the headend unit, said channel having a bandwidth dependent on the number of tones allocated.

11. A two-way point to multipoint data transmission system as claimed in claim 10, wherein groups of said tones define DS0 channels.

12. A two-way point to multipoint data transmission system as claimed in claim 1, wherein said at least one headend modem is connected to a network manager for performing switching functions.

13. A two-way point to multipoint data transmission system as claimed in claim 12, wherein said network manager can connect any incoming channel to a particular subscriber by selecting the appropriate channel to that subscriber determined by the tones allocated for that subscriber.

14. A two-way point to multipoint data transmission system as claimed in claim 1, wherein said downstream units are located off subscriber premises, and demultiplexed signals are carried from said downstream units to subscriber premises over landlines.

15. A two-way point to multipoint data transmission system as claimed in claim 1, wherein said transmission line forms part of a cable TV system said modems share bandwidth with television signals.

16. A two-way point to multipoint data transmission system as claimed in claim 1, wherein said modems comprise an input unit for receiving a multichannel digital data stream, a QAM encoder, an IFFT (Inverse Fast Fourier Transform) for generating an orthogonal frequency division multiplexed output signal having groups of tones corresponding to respective channels in said data stream.

17. A two-way point to multipoint data transmission system as claimed in claim 16, wherein said modems further comprise an input for receiving OFDM modulated signals, an FFT unit for demodulating said signals, and a QAM decoder for generating an output data stream corresponding to at least one channel on said multichannel data stream.

18. A method of establishing two-way point to multipoint communication between a headend modem and a plurality of downstream modems over a transmission line wherein multitone orthogonal frequency division multiplexing (OFDM) is employed to establish two-way communication channels between said headend and downstream modems, said OFDM having a tone spacing selected to minimize the ingress of electromagnetic interference at least in the upstream direction, and said downstream modems are synchronized with a local oscillator at the headend modem by means of a remote tracking loop.

19. A method as claimed in claim 18, wherein error correction signals in said remote tracking loop are carried on OFDM tones.

20. A method as claimed in claim 18, wherein said error correction signals are carried on a RF carrier.

21. A method as claimed in claim 18, wherein individual sub-carriers are remapped to a clear channel in the presence of interference.

* * * * *